United States Patent
Smith

(10) Patent No.: US 10,133,418 B2
(45) Date of Patent: Nov. 20, 2018

(54) FORCE SENSING IN AN ELECTRONIC DEVICE USING A SINGLE LAYER OF STRAIN-SENSITIVE STRUCTURES

(71) Applicant: Apple Inc., Cupertino, CA (US)

(72) Inventor: John Stephen Smith, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/258,810

(22) Filed: Sep. 7, 2016

(65) Prior Publication Data

US 2018/0067612 A1   Mar. 8, 2018

(51) Int. Cl.
  *G06F 3/041*   (2006.01)
  *G06F 3/045*   (2006.01)

(52) U.S. Cl.
  CPC ............ *G06F 3/0418* (2013.01); *G06F 3/045* (2013.01); *G06F 3/0412* (2013.01); *G06F 3/0414* (2013.01); *G06F 2203/04103* (2013.01); *G06F 2203/04105* (2013.01)

(58) Field of Classification Search
  CPC ....... G06F 3/0414; G06F 3/045; G06F 3/0488
  See application file for complete search history.

(56) References Cited

U.S. PATENT DOCUMENTS

| | | | |
|---|---|---|---|
| 3,745,502 A | 7/1973 | Watanabe | |
| 3,876,912 A | 4/1975 | Sanders | |
| 4,345,477 A | 8/1982 | Johnson | |
| 4,423,640 A | 1/1984 | Jetter | |
| 4,516,112 A | 5/1985 | Chen | |
| 4,634,917 A | 1/1987 | Dvorsky et al. | |
| 4,695,963 A | 9/1987 | Sagisawa | |
| 4,951,510 A | 8/1990 | Holm-Kennedy et al. | |
| 5,481,905 A | 1/1996 | Pratt | |
| 5,673,041 A | 9/1997 | Chatigny et al. | |
| 5,708,460 A | 1/1998 | Young | |

(Continued)

FOREIGN PATENT DOCUMENTS

| | | |
|---|---|---|
| CN | 1527933 A | 9/2004 |
| CN | 1796955 | 7/2006 |

(Continued)

OTHER PUBLICATIONS

Bau, et al., "TeslaTouch: Electrovibration for Touch Surfaces," UIST'10, Oct. 3-6, 2010, New York, New York USA, 10 pages.

(Continued)

*Primary Examiner* — Chun-Nan Lin
(74) *Attorney, Agent, or Firm* — Brownstein Hyatt Farber Schreck, LLP

(57) ABSTRACT

A strain-sensitive structure includes two resistive structures connected in series and formed on one surface of a substrate. One resistive structure is formed with a first trace arranged in first trace pattern. The other resistive structure is formed with a second trace arranged in a second trace pattern. The first resistive structure is configured to experience strain in response to an applied stress on the substrate. The second resistive structure is configured to experience less strain in response to the applied stress on the substrate compared to the first resistive structure. Together the strain-sensitive structure and the substrate form a force sensing layer that can be included in an electronic device.

19 Claims, 12 Drawing Sheets

(56) References Cited

U.S. PATENT DOCUMENTS

| | | |
|---|---|---|
| 5,915,285 A | 6/1999 | Sommer |
| 6,288,829 B1 | 9/2001 | Kimura |
| 6,369,865 B2 | 4/2002 | Hinata |
| 6,386,023 B1 | 4/2002 | Sajna et al. |
| 6,812,161 B2 | 11/2004 | Heremans |
| 6,973,837 B2 | 12/2005 | Barnett |
| 7,154,481 B2 | 12/2006 | Cross et al. |
| 7,176,897 B2 | 2/2007 | Roberts |
| 7,190,350 B2 | 3/2007 | Roberts |
| 7,196,694 B2 | 3/2007 | Roberts |
| 7,211,885 B2 | 5/2007 | Nordal et al. |
| 7,331,245 B2 | 2/2008 | Nishimura |
| 7,392,716 B2 | 7/2008 | Wilner |
| 7,441,467 B2 | 10/2008 | Bloom |
| 7,456,823 B2 | 11/2008 | Poupyrev et al. |
| 7,511,702 B2 | 3/2009 | Hotelling |
| 7,538,760 B2 | 5/2009 | Hotelling et al. |
| 7,707,894 B2 | 5/2010 | Sumigawa |
| 7,724,248 B2 | 5/2010 | Saito |
| 7,726,199 B2 | 6/2010 | Shkel et al. |
| 7,755,616 B2 | 7/2010 | Jung et al. |
| 7,800,592 B2 | 9/2010 | Kerr et al. |
| 7,903,091 B2 | 3/2011 | Lee |
| 7,992,448 B2 | 8/2011 | Shimazu |
| 8,020,456 B2 | 9/2011 | Liu et al. |
| 8,050,876 B2 | 11/2011 | Feen et al. |
| 8,056,421 B2 | 11/2011 | Sumigawa |
| 8,077,154 B2 | 12/2011 | Emig et al. |
| 8,132,468 B2 | 3/2012 | Radivojevic |
| 8,243,225 B2 | 8/2012 | Kai et al. |
| 8,266,971 B1 | 9/2012 | Jones |
| 8,305,358 B2 | 11/2012 | Klighhult et al. |
| 8,421,483 B2 | 4/2013 | Klinghult et al. |
| 8,434,369 B2 | 5/2013 | Hou et al. |
| 8,456,430 B2 | 6/2013 | Oliver et al. |
| 8,482,545 B2 | 7/2013 | King-Smith et al. |
| 8,519,974 B2 | 8/2013 | Berggren |
| 8,531,429 B2 | 9/2013 | Chang |
| 8,605,053 B2 | 12/2013 | Murphy et al. |
| 8,640,549 B2 | 2/2014 | Inamori |
| 8,648,816 B2 | 2/2014 | Homma et al. |
| 8,669,952 B2 | 3/2014 | Hashimura et al. |
| 8,669,962 B2 | 3/2014 | Kuan |
| 8,692,646 B2 | 4/2014 | Lee et al. |
| 8,695,433 B2 | 4/2014 | Shimazu |
| 8,711,128 B2 | 4/2014 | Small et al. |
| 8,780,060 B2 | 7/2014 | Maschmeyer et al. |
| 8,780,074 B2 | 7/2014 | Castillo et al. |
| 8,780,543 B2 | 7/2014 | Molne et al. |
| 8,870,087 B2 | 10/2014 | Coogan et al. |
| 8,878,803 B2 | 11/2014 | Kimura et al. |
| 8,982,088 B2 | 3/2015 | Kung |
| 8,988,384 B2 | 3/2015 | Krah et al. |
| 9,007,333 B1 | 4/2015 | Wilson |
| 9,057,653 B2 | 4/2015 | Schediwy |
| 9,024,910 B2 | 5/2015 | Stephanou et al. |
| 9,024,918 B2 | 5/2015 | Cok |
| 9,030,427 B2 | 5/2015 | Yasumatsu |
| 9,063,599 B2 | 6/2015 | Yanagi et al. |
| 9,081,460 B2 | 7/2015 | Jeong et al. |
| 9,099,971 B2 | 8/2015 | Lynn et al. |
| 9,110,532 B2 | 8/2015 | Ando et al. |
| 9,116,569 B2 | 8/2015 | Stacy et al. |
| 9,116,570 B2 | 8/2015 | Lee et al. |
| 9,128,547 B2 | 9/2015 | Kodani et al. |
| 9,134,826 B2 | 9/2015 | Andoh |
| 9,158,407 B2 | 10/2015 | Coulson |
| 9,182,849 B2 | 11/2015 | Huang et al. |
| 9,182,859 B2 | 11/2015 | Coulson et al. |
| 9,200,970 B2 | 12/2015 | Kodani et al. |
| 9,223,162 B2 | 12/2015 | DeForest et al. |
| 9,223,445 B2 | 12/2015 | Sleeman et al. |
| 9,246,486 B2 | 1/2016 | Yang et al. |
| 9,262,002 B2 | 2/2016 | Momeyer et al. |
| 9,292,115 B2 | 3/2016 | Kauhanen et al. |
| 9,304,348 B2 | 4/2016 | Jang |
| 9,329,719 B2 | 5/2016 | Molne et al. |
| 9,360,977 B2 | 6/2016 | Aberg |
| 9,367,173 B2 | 6/2016 | Setlak |
| 9,383,848 B2 | 7/2016 | Daghigh |
| 9,417,696 B2 | 8/2016 | DeLuca |
| 9,417,725 B1 | 8/2016 | Watazu et al. |
| 9,454,268 B2 | 9/2016 | Badaye et al. |
| 9,459,734 B2 | 10/2016 | Day |
| 9,466,783 B2 | 10/2016 | Olien et al. |
| 9,501,167 B2 | 11/2016 | Day |
| 9,507,456 B2 | 11/2016 | Watazu et al. |
| 9,519,378 B2 | 12/2016 | Watazu et al. |
| 9,542,028 B2 | 1/2017 | Filiz et al. |
| 9,557,857 B2 | 1/2017 | Schediwy |
| 9,563,317 B2 | 2/2017 | Sleeman et al. |
| 9,612,170 B2 | 4/2017 | Vosgueritchian et al. |
| 9,639,224 B2 | 5/2017 | Lee |
| 9,658,722 B2 | 5/2017 | Schwartz |
| 9,665,200 B2 | 5/2017 | Filiz et al. |
| 9,690,408 B1 | 6/2017 | Krah |
| 9,690,414 B2 | 6/2017 | Kano et al. |
| 9,729,730 B2 | 8/2017 | Levesque et al. |
| 9,791,968 B2 | 10/2017 | Yang |
| 9,841,850 B2 | 12/2017 | Schediwy et al. |
| 9,864,450 B2 | 1/2018 | Watazu et al. |
| 9,881,577 B2 | 1/2018 | Wang et al. |
| 9,916,942 B2 | 3/2018 | Shedletsky |
| 10,007,380 B2 | 6/2018 | Yoon et al. |
| 10,032,592 B2 | 7/2018 | Brooks et al. |
| 2002/0149571 A1 | 10/2002 | Roberts |
| 2006/0043508 A1 | 3/2006 | Ohta et al. |
| 2007/0159561 A1 | 7/2007 | Chien |
| 2008/0165159 A1 | 7/2008 | Soss et al. |
| 2008/0218488 A1 | 9/2008 | Yang et al. |
| 2009/0002199 A1 | 1/2009 | Lainonen et al. |
| 2009/0189866 A1 | 7/2009 | Haffenden et al. |
| 2009/0316380 A1 | 12/2009 | Armstrong |
| 2010/0053116 A1 | 3/2010 | Daverman et al. |
| 2010/0103115 A1 | 4/2010 | Hainzl |
| 2010/0117809 A1 | 5/2010 | Dai et al. |
| 2010/0123686 A1 | 5/2010 | Klinghult et al. |
| 2010/0201635 A1* | 8/2010 | Klinghult ............. G06F 3/0414 345/173 |
| 2011/0045285 A1 | 2/2011 | Saiki et al. |
| 2011/0248839 A1 | 10/2011 | Kwok et al. |
| 2011/0261021 A1 | 10/2011 | Modarres et al. |
| 2011/0285660 A1 | 11/2011 | Prabhu et al. |
| 2012/0019448 A1 | 1/2012 | Pitkanen et al. |
| 2012/0038577 A1 | 2/2012 | Brown et al. |
| 2012/0105367 A1 | 5/2012 | Son et al. |
| 2012/0127136 A1 | 5/2012 | Schneider et al. |
| 2012/0154299 A1 | 6/2012 | Hsu et al. |
| 2012/0188198 A1 | 7/2012 | Jeong et al. |
| 2012/0293491 A1 | 11/2012 | Wang et al. |
| 2013/0074988 A1 | 3/2013 | Chou |
| 2013/0082970 A1 | 4/2013 | Frey et al. |
| 2013/0141365 A1 | 6/2013 | Lynn et al. |
| 2013/0147739 A1 | 6/2013 | Aberg et al. |
| 2013/0154933 A1 | 6/2013 | Sheik-Nainar |
| 2013/0215056 A1 | 8/2013 | Johansson et al. |
| 2013/0222306 A1 | 8/2013 | Aberg et al. |
| 2013/0328803 A1 | 12/2013 | Fukushima et al. |
| 2013/0333922 A1 | 12/2013 | Kai et al. |
| 2014/0085253 A1 | 3/2014 | Leung et al. |
| 2014/0118635 A1 | 5/2014 | Yang |
| 2014/0174190 A1 | 6/2014 | Kulkarni et al. |
| 2014/0191973 A1 | 7/2014 | Zellers et al. |
| 2014/0327847 A1 | 11/2014 | Park et al. |
| 2015/0002452 A1 | 1/2015 | Klinghult |
| 2015/0101849 A1 | 4/2015 | Bockmeyer et al. |
| 2015/0116260 A1 | 4/2015 | Hoen et al. |
| 2015/0242037 A1 | 8/2015 | Pedder et al. |
| 2015/0268725 A1 | 9/2015 | Levesque et al. |
| 2015/0301684 A1 | 10/2015 | Shimamura |
| 2015/0331517 A1 | 11/2015 | Filiz et al. |
| 2016/0003697 A1 | 1/2016 | Okamoto et al. |
| 2016/0033389 A1 | 2/2016 | Serpe |
| 2016/0034073 A1 | 2/2016 | Andoh |

(56) References Cited

U.S. PATENT DOCUMENTS

| | | | |
|---|---|---|---|
| 2016/0035290 A1* | 2/2016 | Kim | G06F 3/0412 345/174 |
| 2016/0041672 A1 | 2/2016 | Hoen et al. | |
| 2016/0048266 A1 | 2/2016 | Smith et al. | |
| 2016/0062517 A1 | 3/2016 | Meyer et al. | |
| 2016/0077649 A1 | 3/2016 | Ando et al. | |
| 2016/0117035 A1 | 4/2016 | Watazu et al. | |
| 2016/0132151 A1 | 5/2016 | Watazu et al. | |
| 2016/0147353 A1 | 5/2016 | Filiz et al. | |
| 2016/0306481 A1 | 10/2016 | Filiz et al. | |
| 2016/0357297 A1 | 12/2016 | Picciotto et al. | |
| 2017/0031495 A1 | 2/2017 | Smith | |
| 2017/0075465 A1 | 3/2017 | Pedder et al. | |
| 2017/0090638 A1 | 3/2017 | Vosgueritchian et al. | |
| 2017/0090655 A1 | 3/2017 | Zhang et al. | |
| 2017/0191884 A1 | 7/2017 | Vosgueritchian et al. | |
| 2017/0261387 A1 | 9/2017 | Vosgueritchian et al. | |
| 2017/0269757 A1 | 9/2017 | Filiz et al. | |
| 2017/0285864 A1 | 10/2017 | Pedder et al. | |
| 2018/0059839 A1 | 3/2018 | Kim et al. | |
| 2018/0074638 A1 | 3/2018 | Chiang et al. | |

FOREIGN PATENT DOCUMENTS

| | | |
|---|---|---|
| CN | 1860432 | 11/2006 |
| CN | 101017419 | 8/2007 |
| CN | 101071354 | 11/2007 |
| CN | 101201277 A | 6/2008 |
| CN | 101243383 | 8/2008 |
| CN | 101950224 | 1/2011 |
| CN | 102012772 | 4/2011 |
| CN | 102047088 | 5/2011 |
| CN | 102165400 | 8/2011 |
| CN | 102175362 A | 9/2011 |
| CN | 102368191 | 3/2012 |
| CN | 102460351 | 5/2012 |
| CN | 102591519 | 7/2012 |
| CN | 102822779 | 12/2012 |
| CN | 103026327 | 4/2013 |
| CN | 103069365 | 4/2013 |
| CN | 103197821 | 7/2013 |
| CN | 103336562 | 10/2013 |
| CN | 103582807 | 2/2014 |
| CN | 204461655 U | 7/2015 |
| CN | 204576454 U | 8/2015 |
| CN | 105444662 | 3/2016 |
| EP | 0332365 | 9/1989 |
| EP | 0467562 | 1/1992 |
| EP | 1840714 | 10/2007 |
| EP | 2120136 | 11/2009 |
| EP | 2381340 | 10/2011 |
| EP | 2629075 | 8/2013 |
| FR | 2907563 | 4/2008 |
| JP | 201039458 A | 2/2010 |
| JP | 2010197066 | 9/2010 |
| WO | WO 96/038833 | 12/1996 |
| WO | WO 02/035461 | 5/2002 |
| WO | WO 07/074800 | 7/2007 |
| WO | WO 08/076393 | 6/2008 |
| WO | WO 11/156447 | 12/2011 |
| WO | WO 12/168892 | 12/2012 |
| WO | WO 13/177322 | 11/2013 |
| WO | WO 15/106183 | 7/2015 |
| WO | WO 15/158952 | 10/2015 |
| WO | WO 16/029354 | 3/2016 |

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

Rausch, "Printed piezoresistive strain sensors for monitoring of light-weight structures," Sensor+Test Conferences 2011—Sensor Proceedings, pp. 216-220.

Schweizer, "Electrical characterization and investigation of the piezoresistive effect of PEDOT:PSS thin films," A Thesis Presented to the Academic Faculty in Partial Fulfillment of the Requirements for the Degree Master of Science of Electrical and Computer Engineering, Georgia Institute of Technology, Apr. 2005, 89 pages.

Takamatsu, et al., "Transparent conductive-polymer strain sensors for touch input sheets of flexible displays," *Journal of Micromechanics and Microengineering*, vol. 20, 2010, 6 pages.

Tsai, et al., "Fabrication of Graphene-based Micro Strain Gauge," NPL Management Ltd.—Internal, Oct. 15-16, 2012, 1 page.

* cited by examiner

FORCE SENSING IN AN ELECTRONIC DEVICE USING A SINGLE LAYER OF STRAIN-SENSITIVE STRUCTURES

FIELD

The described embodiments relate generally to strain sensing. More particularly, the present embodiments relate to force sensing in an electronic device using strain-sensitive structures formed in or on one surface of a substrate.

BACKGROUND

Many electronic and input devices include a touch-sensitive surface for receiving user inputs. Devices such as smart telephones, tablet computing devices, laptop computers, track pads, wearable communication and health devices, navigation devices, and kiosks can include a touch-sensitive surface. In some cases, the touch-sensitive surface is integrated with a display to form a touch-screen or touch-sensitive display.

The touch-sensitive surface may detect and relay the location of one or more user touches, which may be interpreted by the electronic device as a command or a gesture. In one example, the touch input may be used to interact with a graphical user interface presented on the display of the device. In another example, the touch input may be relayed to an application program operating on a computer system to effect changes to the application program.

Touch-sensitive surfaces, however, are limited to providing only the location of one or more touch events. Moreover, touch, like many present inputs for computing devices, is binary. The touch is either present or it is not. Binary inputs are inherently limited insofar as they can only occupy two states (present or absent, on or off, and so on). In many examples, it may be advantageous to also detect and measure the force of a touch that is applied to a surface. In addition, when force is measured across a continuum of values, it can function as a non-binary input.

SUMMARY

Certain embodiments described herein reference a strain or force sensing layer that includes at least one strain-sensitive structure. A strain-sensitive structure includes a first trace formed on only one surface of a substrate and a second trace formed on the same surface of the substrate. The first trace forms a first resistive structure and the second trace forms a second resistive structure. The second trace is connected in series with the first trace. The first trace includes: a first section comprising a first set of legs arranged in a serpentine pattern, the first set of legs having a first length extending along a first axis; a second section comprising a second set of legs arranged in the serpentine pattern, the second set of legs having the first length extending along the first axis; and a third section including a leg extending along a second axis and connecting the first section to the second section. The second trace includes: a fourth section positioned adjacent three sides of the first section, the fourth section comprising a third set of legs arranged in a serpentine pattern, the third set of legs having a second length that is less than the first length; and a fifth section connected to the fourth section, the fifth section positioned adjacent three sides of the second section, the fifth section comprising a fourth set of legs arranged in a serpentine pattern, the fourth set of legs having the second length. In some embodiments, the first and second trace patterns can be arranged to reduce, minimize, or substantially cancel magnetic interference.

In some embodiments, a strain-sensitive structure includes a first trace arranged in a first trace pattern on a surface of a substrate and a second trace arranged in a second trace pattern on the surface of the substrate. The first trace forms a first resistive structure and the second trace forms a second resistive structure that is connected in series with the first resistive structure. The first resistive structure experiences strain in response to an applied stress on the substrate. The second resistive structure experiences less strain than the first resistive structure in response to the applied stress on the substrate. Additionally or alternatively, a resistance of the first resistive structure changes more compared to a resistance of the second resistive structure in response to one or more forces that are applied to the surface of the substrate.

Further embodiments described herein may relate to, include, or take the form of an electronic device that includes a display layer positioned below a cover layer, and a force sensing layer positioned over or below the display layer. The force sensing layer includes a substrate and a plurality of strain-sensitive structures formed on a surface of the substrate. A processing device is operably (e.g., electrically) connected to the plurality of strain-sensitive structures. The processing device is configured to receive a strain signal from each strain-sensitive structure and correlate at least one strain signal into an amount of force applied to the cover layer. At least one strain-sensitive structure in the plurality of strain-sensitive structures includes a first trace arranged in a first trace pattern on the surface of the substrate and forming a first resistive structure, and a second trace arranged in a second trace pattern on the surface of the substrate and forming a second resistive structure, the second resistive structure connected in series with the first resistive structure. The first trace pattern of the first resistive structure is sensitive to strain in one or more directions in response to an applied stress on the substrate. The second trace pattern of the second resistive structure is less sensitive to strain in any direction in response to the applied stress on the substrate.

In some embodiments, a method of fabricating a strain-sensitive structure on a substrate includes forming a conductive material over the substrate and forming the strain-sensitive structure by etching a first trace and a second trace in the conductive material in one etching operation. The first trace is etched into a first trace pattern and the second trace is etched into a second trace pattern and the first trace and the second trace are connected in series. The substrate is then etched to produce trenches around and between the first trace and the second trace. When the substrate is etched, the first trace and the second trace act as a mask such that the trenches are self-aligned with the first trace and the second trace.

BRIEF DESCRIPTION OF THE DRAWINGS

The disclosure will be readily understood by the following detailed description in conjunction with the accompanying drawings, wherein like reference numerals designate like structural elements, and in which.

Figure 1:
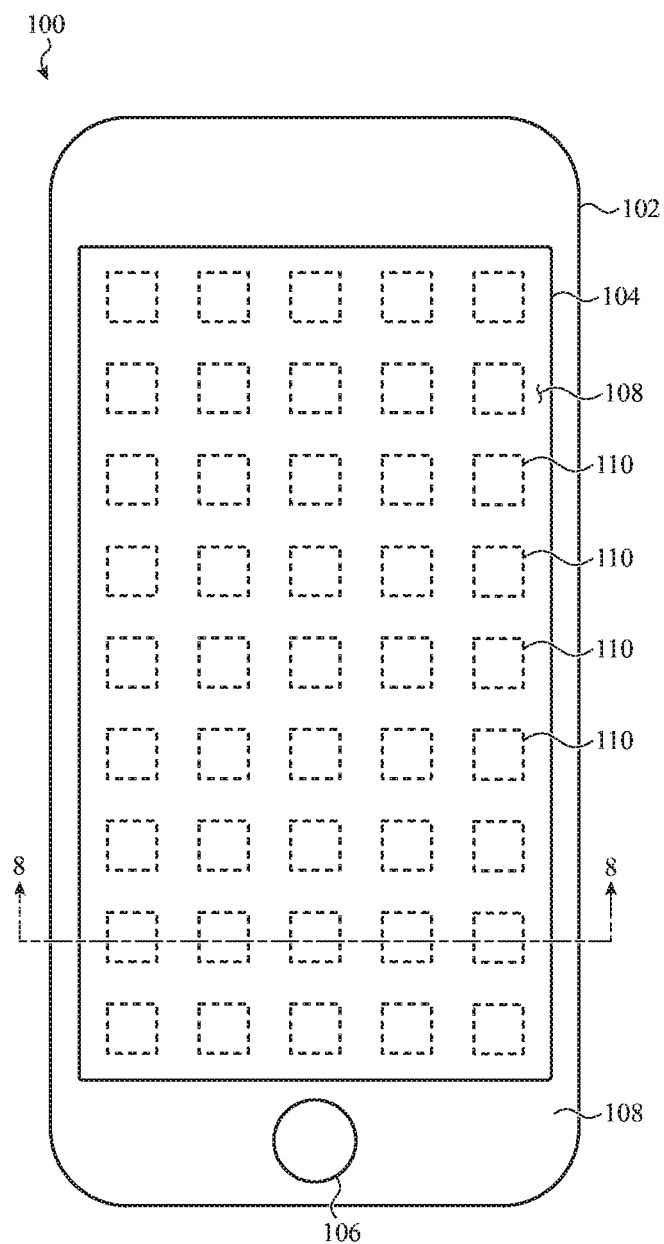
FIG. 1 shows one example of an electronic device that can include one or more strain-sensitive structures.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein reference an electronic device that includes an input device configured to determine an amount of force applied to an input surface of the input device. The input device includes a force sensing layer having one or more strain-sensitive or strain-responsive structures formed on one surface of a substrate. The force sensing layer can be incorporated into any suitable type of input device. Example input devices include, but are not limited to, a touch display, a button, a section of an enclosure of the electronic device, and a track pad.

Each strain-sensitive structure includes two resistive structures connected in series. One resistive structure is formed with a first trace arranged in a first trace pattern. Sections of the first trace have legs that are arranged in a serpentine pattern.

The other resistive structure is formed with a second trace arranged in a second trace pattern. The second trace includes legs that are also arranged in a serpentine pattern. The number of legs in the second trace is greater than the number of legs in the first trace, and the legs in the second trace are shorter than the legs in the first trace.

In particular, the resistance of the resistive structure formed by the first trace changes in response to strain while the resistance of the resistive structure formed by the second trace changes less in response to the strain. This is at least partly due to the legs in the second trace contacting the substrate over shorter distances (e.g., the length of the legs in the second trace is less than the length of the legs in the first trace). When the second trace is formed with a material having a high Young's modulus (e.g., metal), and is supported by a substrate formed with a material having a lower Young's modulus (e.g., plastic), strain is reduced in the second trace and experienced by the substrate. Thus, the strain experienced by the first trace only can be measured and correlated to an amount or magnitude of applied force.

In some embodiments, the strain-sensitive or responsive structure(s) can be operably connected to two reference resistive structures in a balancing network configuration, such as a Wheatstone bridge configuration. Because the strain-sensitive structures are formed on only one surface of the substrate and operate in a balancing network configuration, the strain-sensitive structures operate relatively independent of changes in temperature and environment (e.g., humidity). Additionally, matching the resistances of the first and second resistive structures may be more accurate because the first trace and the second trace can be formed at the same time, with the same material, and with the same fabrication process.

Moreover, the strain-sensitive structures can be easier to fabricate because the first and second traces are formed on only one surface of a substrate at the same time, with the same material, and with the same fabrication process. For example, in one embodiment, the first trace and the second trace are formed with a copper-nickel alloy (e.g., Constantan). The copper-nickel alloy is formed on the substrate (e.g., deposited or grown) and/or patterned (e.g., with photolithography) at the same time and on the same side of the substrate. In other embodiments, the first trace and the second trace can be formed with a different material, such as isoelastic, nichrome, tantalum nitride, and chromium nitride. Additionally or alternatively, the first trace and/or the second trace may be formed with a stack of conductive layers. For example, the conductive material for the first trace and the second trace can include a first layer of a first conductive material (e.g., a nichrome material) and a second layer of a second conductive material (e.g., Constantan) formed over the first layer.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 shows one example of an electronic device that can include one or more strain-sensitive structures. In the illustrated embodiment, the electronic device 100 is implemented as a smart telephone. Other embodiments can implement the electronic device differently. For example, an electronic device can be a laptop computer, a tablet computing device, a wearable computing device, a digital music player, a display input device, a kiosk, a remote control device, a television, and other types of electronic devices that include one or more strain-sensitive structures.

The electronic device 100 includes an enclosure 102 at least partially surrounding a display 104 and one or more input/output (I/O) devices 106. The enclosure 102 can form an outer surface or partial outer surface for the internal components of the electronic device 100. The enclosure 102 can be formed of one or more components operably connected together, such as a front piece and a back piece. Alternatively, the enclosure 102 can be formed of a single piece operably connected to the display 104.

The display 104 can provide a visual output to the user. The display 104 can be implemented with any suitable technology, including, but not limited to, a multi-touch sensing touchscreen that uses a liquid crystal display (LCD) element, a light emitting diode (LED) technology, an organic light-emitting display (OLED) element, an organic electroluminescence (OEL) element, or another type of display element. In some embodiments, the display 104 can function as an input device that allows the user to interact with the electronic device 100. For example, the display 104 can be a multi-touch touchscreen LED display.

In some embodiments, the I/O device 106 can take the form of a home button, which may be a mechanical button, a soft button (e.g., a button that does not physically move but still accepts inputs), an icon or image on a display, and so on. Further, in some embodiments, the I/O device 106 can be integrated as part of a cover layer 108 and/or the enclosure 102 of the electronic device 100. Although not shown in FIG. 1, the electronic device 100 can include other types of I/O devices, such as a microphone, a speaker, a camera, and one or more ports, such as a network communication port and/or a power cord port.

The cover layer 108 may be positioned over the front surface of the electronic device 100. At least a portion of the cover layer 108 can receive touch and/or force inputs. The cover layer 108 can be formed with any suitable transparent material, such as glass, plastic, sapphire, or combinations thereof. In one embodiment, the cover layer 108 covers the display 104 and the I/O device 106. Touch and force inputs can be received by the portion of the cover layer 108 that covers the display 104 and/or by the portion of the cover layer 108 that covers the I/O device 106. In another embodiment, the cover layer 108 covers the display 104 but not the I/O device 106. In such embodiments, the I/O device 106 can be positioned in an opening or aperture formed in the cover layer 108 and/or in the enclosure 102. The I/O device 106 can receive touch and/or force inputs as well as the portion of the cover layer 108 that covers the display 104.

A strain-sensitive structure or structures 110 can be included in one or more locations of the electronic device 100. In the illustrated embodiment, the strain-sensitive structures 110 are formed as an array of rectilinear strain-sensitive structures, although other shapes and array patterns can also be used. In many examples, each individual strain-sensitive structure 110 may have a selected shape and/or pattern. For example, in certain embodiments, a strain-sensitive structure 110 may be formed, patterned, or deposited with one trace formed in a first trace pattern and a second trace formed in a second trace pattern, as is described in more detail in conjunction with FIGS. 2A-2E.

In one embodiment, the strain-sensitive structures 110 are formed in a patterned metal layer. Any suitable material or materials that exhibit a change in resistance can be used to form the strain-sensitive structures 110. Such materials include, but are not limited to, metal or a metal alloy, such as a copper-nickel alloy (e.g., Constantan), isoelastic, nichrome, tantalum nitride, chromium nitride, polyethyleneioxythiophene, carbon nanotubes, graphene, silver nanowire, other metallic nanowires, and the like.

The type of material(s) that is used to form a strain-sensitive structure 110 can be based at least in part on the location of the strain-sensitive structure 110 within the electronic device 100. For example, in one embodiment, the strain-sensitive structure(s) 110 may be included in a display stack of the display 104. The strain-sensitive structures 110 can be used to measure an amount of force and/or a change in force that is applied to the display 104 or to a portion of the display 104. In such embodiments, the one or more strain-sensitive structures 110 can be formed with an optically transparent material.

In another embodiment, one or more strain-sensitive structures 110 may be included in the I/O device 106. The strain-sensitive structure(s) 110 can be used to measure an amount of force and/or a change in force that is applied to the I/O device 106. Additionally or alternatively, one or more strain-sensitive structures 110 can be positioned under at least a portion of the enclosure 102 to detect a force and/or a change in force that is applied to the enclosure 102. In such embodiments, the strain-sensitive structures 110 can be formed with an optically transparent material or with an opaque material.

Embodiments are described herein in conjunction with a display stack of a display (e.g., display 104). In one non-limiting example, the entire top surface of the display 104 (or the cover layer 108 disposed over the top surface of the display 104) may be an input region that is configured to receive touch and/or force inputs from a user. As will be described in more detail later, the strain-sensitive structures 110 are formed on a single surface of a substrate to produce a force sensing layer.

FIGS. 2A-2E show a first example of a strain-sensitive structure that is suitable for use in a force sensing layer. With respect to FIG. 2A, the strain-sensitive structure 200 includes a continuous first trace 202 and a continuous second trace 204 that is connected in series with the first trace 202. The first trace 202 forms a first resistive structure in the strain-sensitive structure 200. The second trace 204 forms a second resistive structure in the strain-sensitive structure 200 that is connected in series with the first resistive structure. The first and the second resistive structures can have any suitable resistance. In one embodiment, the resistance of the first and the second resistive structures is approximately twenty-five (25) to one hundred (100) kilohms.

Three terminals or signal lines 310, 312, 316 are connected to the strain-sensitive structure 200. A first terminal 310 connects to one end of the first trace 202 and a second terminal 312 connects to a first end of the second trace 204. A common terminal 316 connects to the other ends of the first and second traces 202, 204. The three terminals or signal lines 310, 312, 316 are discussed in more detail in conjunction with FIG. 3.

As described earlier, the first and the second traces 202, 204 can be formed with any suitable material or materials that exhibit a change in resistance. Such materials include, but are not limited to, metal or a metal alloy, such as a copper-nickel alloy (e.g., Constantan), isoelastic, nichrome, tantalum nitride, chromium nitride, polyethyleneioxythiophene, carbon nanotubes, graphene, silver nanowire, other metallic nanowires, and the like.

For ease of understanding only, the pattern that forms the strain-sensitive structure 200 is divided into four sections 206, 208, 210, 212 using dashed lines 214, 216. In one embodiment, the pattern is a single pattern with the first and the second traces 202, 204 running continuously through the pattern. In other embodiments, one or more sections 206, 208, 210, 212 may be formed on the surface of the substrate and used to detect strain and correlate the detected strain to an amount of force. For example, in one embodiment, a strain-sensitive structure may be formed with only two sections (e.g., sections 206 and 212). Alternatively, a strain-sensitive structure may be formed with only one section (e.g., 206 or 208).

Figure 2A:
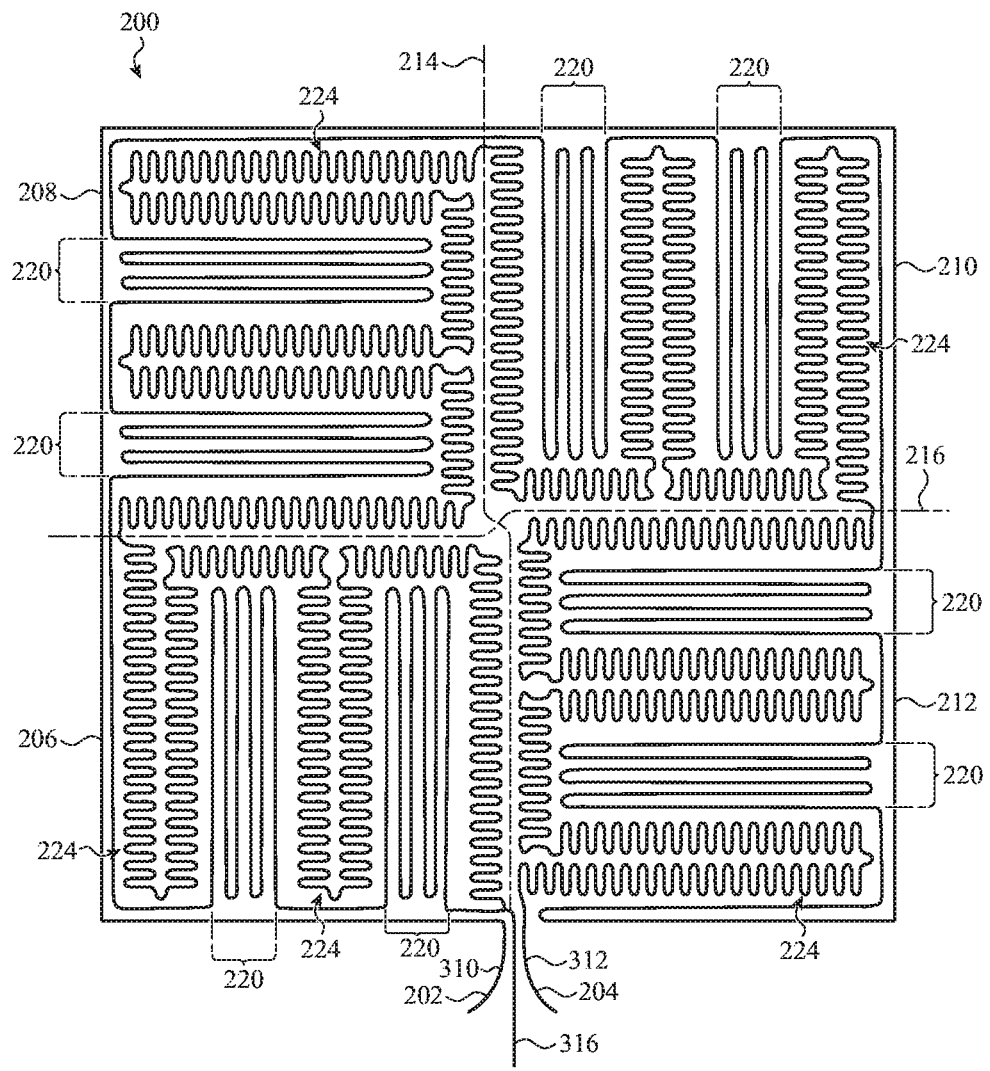
FIGS. 2A-2E show a first example of a strain-sensitive structure that is suitable for use in a force sensing layer.
Figure 2B:
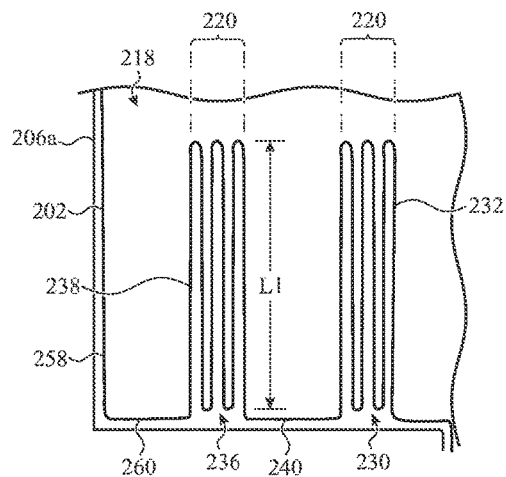

FIG. 2B depicts the first trace 202 in the first section 206 of the strain-sensitive structure (identified as 206a). The first trace 202 is formed into a first trace pattern 218. The first trace pattern 218 includes sections 220 having legs that are arranged in a serpentine pattern. The legs in the sections 220 have a first length that extends along a first axis 234 (see FIG. 2D). As used herein, the term "length" refers generally to a segment or leg of the first trace or of the second trace that does not experience a change in direction or trajectory. For example, in FIG. 2B, the first length refers to each segment that extends along a respective axis (e.g., the first axis 234). Alternatively, in FIG. 2F, the first length of the legs in the first trace 202 refers to the segments that have a given radius of curvature.

Figure 2C:
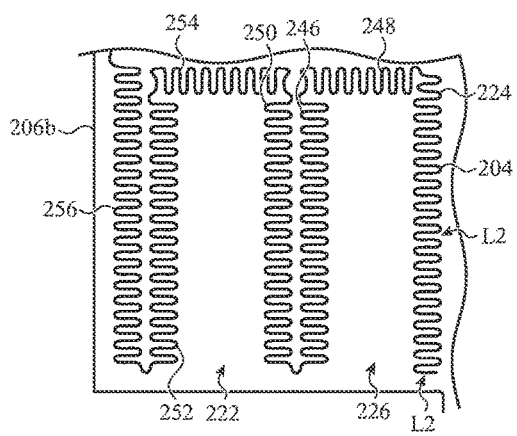

FIG. 2C depicts the second trace 204 in the first section 206 of the strain-sensitive structure (identified as 206b). The second trace 204 is arranged in a second trace pattern 222. The second trace pattern 222 includes legs 224 that are arranged in a serpentine pattern. The legs have a shorter second length compared to the length of the legs in sections 220. Accordingly, the second trace 204 includes more conductive material than the first trace 202 because the serpentine pattern of the second trace 204 includes a greater number of legs. The legs in the second trace 204 are denser or more compact compared to the legs in the first trace 202. In FIG. 2C, the second length refers to each segment or leg that extends along a respective axis (e.g., the second axis 242).

As depicted in FIGS. 2B and 2C, the first and second trace patterns 218, 222 complement each other in that each section 220 of the first trace pattern 218 is positioned in a U-shaped arrangement 226 of the second trace pattern 222. In other words, sections 220 of the first trace 202 are bordered on three sides by the second trace 204.

Other embodiments can arrange the first and second trace patterns 218, 222 differently. For example, two sections 220 of the first trace 202 can be included within a U-shaped arrangement 226 of the second trace 204. In another example, the first section can include only one section 220, and that one section 220 may be bordered on three sides by the second trace 204. Alternatively, the first and/or the second trace 202, 204 can be arranged in a pattern that includes diagonal sections. In some embodiments, the open end of one U-shaped arrangement 226 can be adjacent a first side of the section 206 while the open end of another U-shaped arrangement 226 can be adjacent a different section side of the section 206 (e.g., an opposing second side of the section 206).

Figure 2D:
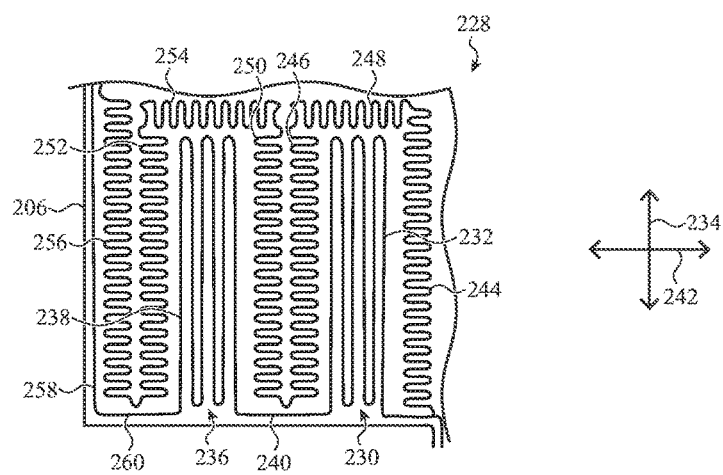

As shown in FIG. 2D, the first section 206 is formed by combining the first and second trace patterns 218, 222. The combination of the first trace pattern 218 and the second trace pattern 222 is referred to herein as a pattern template. The pattern template 228 is used to produce the pattern of the strain-sensitive structure 200 shown in FIG. 2A.

As shown in FIGS. 2B and 2D, the first trace 202 includes a first section 230 that includes a first set of legs 232 arranged in a serpentine pattern, the first set of legs 232 having a first length (L1) extending along a first axis 234. The first trace 202 further includes a second section 236 that includes a second set of legs 238 arranged in a serpentine pattern. The second set of legs 238 extends along the first axis 234 and has the first length L1.

A third section 240 includes a leg that connects the first section 230 to the second section 236. The third section 240 extends along a second axis 242.

With respect to FIGS. 2C and 2D, the second trace 204 includes a fourth section 244 positioned adjacent a first side of the first section 230. The fourth section 244 extends along the first axis 234 and includes a third set of legs 224 that are arranged in a serpentine pattern. The third set of legs 224 in the serpentine pattern extends along the second axis 242 and has a second length (L2) that is different from the first length. In the illustrated embodiment, the second length is less than the first length.

The second trace 204 also includes a fifth section 246 positioned adjacent a second side of the first section 230. The fifth section 246 extends along the first axis 234 and includes a fourth set of legs 224 that is arranged in a serpentine pattern. The fourth set of legs 224 in the serpentine pattern extends along the second axis 242 and has the second length L2.

A sixth section 248 of the second trace 204 connects the fourth section 244 to the fifth section 246. In the illustrated embodiment, the sixth section 248 connects a first end of the fourth section 244 to a first end of the fifth section 246. The sixth section 248 extends along the second axis 242. The sixth section 248 includes a fifth set of legs 224 that is arranged in the serpentine pattern. The fifth set of legs 224 in the serpentine pattern extends along the first axis 234 and has the second length L2.

A seventh section 250 of the second trace 204 connects to the fifth section 246. In the illustrated embodiment, a first end of the seventh section 250 connects to a second end of the fifth section 246. The seventh section 250 is positioned adjacent a first side of the second section 236. The seventh section 250 extends along the first axis 234 and includes a sixth set of legs 224 that is arranged in the serpentine pattern. The sixth set of legs 224 in the serpentine pattern extends along the second axis 242 and has the second length L2.

An eighth section 252 of the second trace 204 is positioned adjacent a second side of the second section 236. The eighth section 252 extends along the first axis 234 and includes a seventh set of legs 224 that is arranged in the serpentine pattern. The seventh set of legs 224 in the serpentine pattern extends along the second axis 242 and has the second length L2.

A ninth section 254 of the second trace 204 connects the seventh section 250 to the eighth section 252. In the illustrated embodiment, the ninth section 254 connects the second end of the seventh section 250 to a first end of the eighth section 252. The ninth section 254 extends along the second axis 242 and includes an eighth set of legs 224 that is arranged in the serpentine pattern. The eighth set of legs 224 in the serpentine pattern extends along the first axis 234 and has the second length L2.

A tenth section 256 of the second trace 204 connects to the eighth section 252 (e.g., to a second end of the eighth section 252). The tenth section 256 extends along the first axis 234 and includes a ninth set of legs 224 that is arranged in the serpentine pattern. The ninth set of legs 224 in the serpentine pattern extends along the second axis 242 and has the second length L2.

Returning to FIGS. 2B and 2D, the first trace 202 can include an eleventh section 258 that is positioned adjacent to the tenth section 256 of the second trace 204 (the side of the tenth section 256 that is opposite the second section 236 of the first trace 202). The eleventh section 258 includes a leg that extends along the first axis 234. A twelfth section 260 of the first trace 202 connects the eleventh section 258 to the second section 236 of the first trace 202.

In FIG. 2D, the second axis 242 is normal to the first axis 234, although this is not required. Alternatively, in some embodiments, the first and second axes 234, 242 can be normal to each other and both axes 234, 242 rotated a given angle (e.g., rotated at a forty-five degree angle).

Figure 2E:
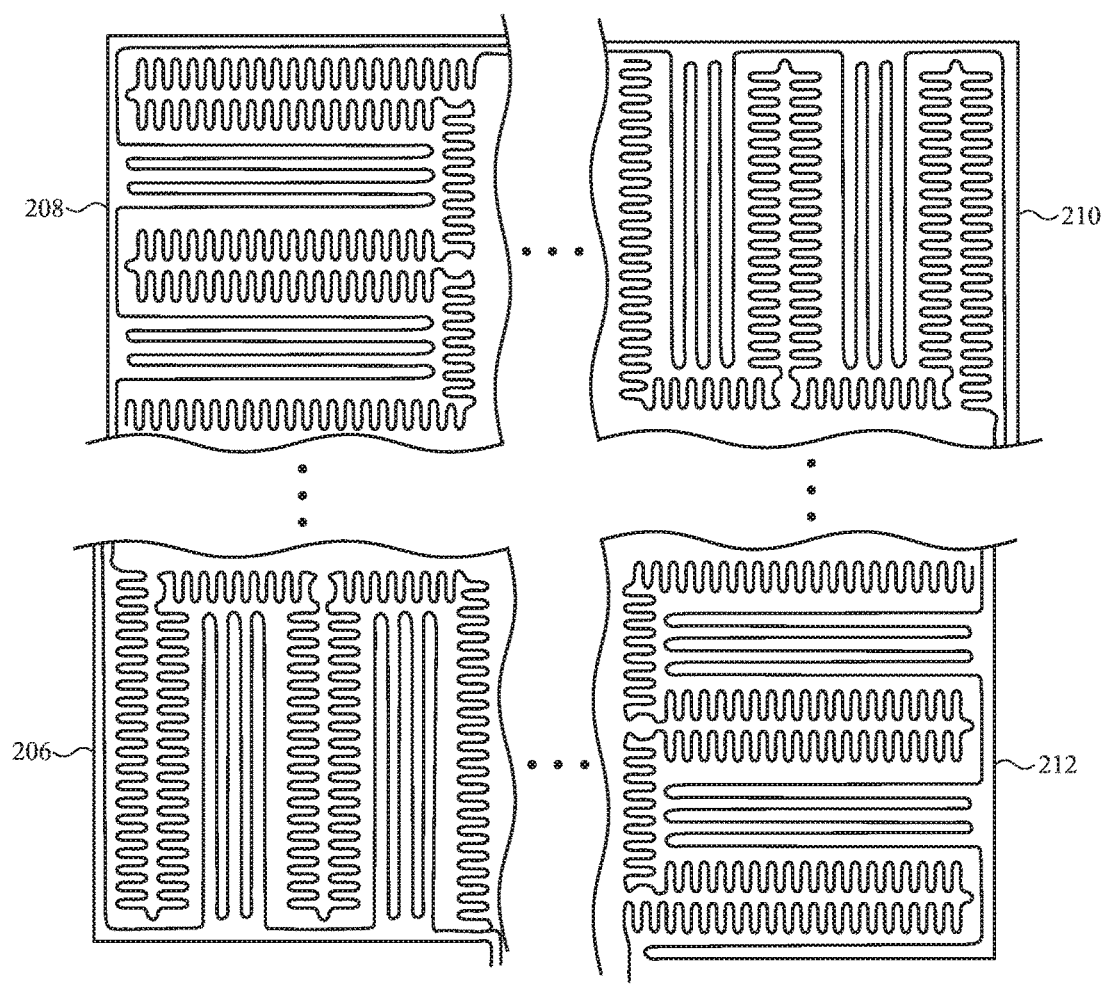

FIG. 2E shows an exploded view of the four sections 206, 208, 210, 212 of the strain-sensitive structure 200. To produce the pattern shown in FIG. 2A, the pattern template 228 in section 206 is rotated ninety degrees to produce the second section 208. The pattern template 228 in section 206 is rotated one hundred and eighty degrees to produce the third section 210. And the pattern template 228 in section 206 is rotated two hundred and seventy degrees to produce the fourth section 212.

In other words, each section is rotated a positive ninety (+90) degrees and a negative ninety (−90) degrees to produce its neighboring (contiguous) sections. The first section 206 is rotated a positive ninety degrees to produce the second section 208 and a negative ninety degrees to produce the fourth section 212. The second section 208 is rotated a positive ninety degrees to produce the third section 210 and a negative ninety degrees to produce the first section 206. The third section 210 is rotated a positive ninety degrees to produce the fourth section 212 and a negative ninety degrees to produce the second section 208. Finally, the fourth section 212 is rotated a positive ninety degrees to produce the first section 206 and a negative ninety degrees to produce the third section 210.

In the strain-sensitive structure 200, the first trace 202 is sensitive to strain because the legs in the sections 230, 236, 240, 258, and 260 are in contact with the substrate over relatively long distances. Consequently, the first trace 202 does not have an opportunity to be strained differently from the substrate. The first trace 202 compresses or elongates in response to an applied stress. Additionally, based on the rotated first trace patterns 218 in the strain-sensitive structure 200, the first trace 202 detects strain in a first direction and in a second direction normal to the first direction (e.g., along axes 234 and 242).

Unlike the first trace 202, the second trace 204 can be less sensitive to strain. The legs 224 in the serpentine pattern are in contact with the substrate over shorter distances. Consequently, the legs 224 experience less tension or compression in response to strain compared to the first trace 202. The strain is instead applied to the substrate. In other words, the second trace 204 acts as a strain relief structure, allowing the strain experienced by the strain-sensitive structure 200 to be determined based on the net strain on the surface of the substrate. The second resistive structure formed by the second trace 204 may act as a reference for the first resistive structure formed by the first trace 202.

Additionally, the strain-sensitive structure 200 may operate relatively independent of changes in temperature and environment because the first and second traces 202, 204 are formed on only one surface of the substrate using the same material or materials. Moreover, the strain-sensitive structure 200 may be easier to fabricate because the first and second traces 202, 204 can be formed at the same time using the same fabrication process. Because the first and second traces 202, 204 are formed at the same time and with the same material, the resistances of the first and second traces 202, 204 may be matched more accurately.

As described earlier, the first resistive structure formed by the first trace 202 is typically the only resistive structure that detects strain. When a user exerts a force on an input surface (e.g., cover layer 108 in FIG. 1), the input surface may flex in response. When the force is sufficient, the flex in the input surface transfers to the force sensing layer, which causes the surfaces of the substrate to compress or elongate. This compression or elongation causes the strain-sensitive structures to experience compression or tension. Based on the first and second trace patterns 218, 222 of the strain-sensitive structure 200, an electrical property (e.g., electrical resistance) of the strain-sensitive structure 200 changes as a result of the compression or tension. The change in resistance is represented in a signal level of a strain signal (e.g., a voltage level). The strain signal can be correlated to the amount of force applied to the input surface.

In particular, with the strain-sensitive structure 200, the resistance of the first resistive structure formed by the first trace 202 changes based on stress. As discussed earlier, the second resistive structure formed by the second trace 204 experiences less strain compared to the first trace 202, so the resistance of the second resistive structure changes less (e.g., has insignificant changes) in response to the stress. Accordingly, the strain signal received from the strain-sensitive structure 200 represents the strain experienced substantially by the first resistive structure in the strain-sensitive structure 200.

Thus, the resistances of the first and second traces 202, 204 are substantially the same when a force is not applied to the substrate. When one or more forces are applied to the substrate, the resistance of the first trace 202 changes more compared to the resistance of the second trace 204.

Figure 2F:
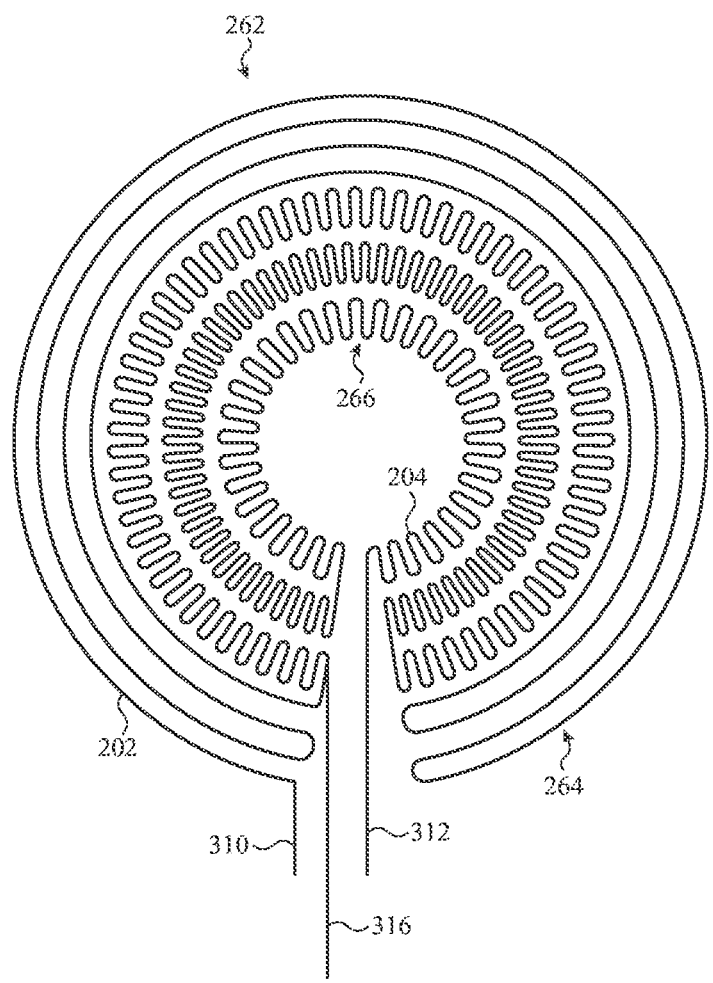
FIG. 2F depicts a second example strain-sensitive structure that is suitable for use in a force sensing layer.

FIG. 2F depicts a second example strain-sensitive structure that is suitable for use in a force sensing layer. The strain-sensitive structure 262 includes a continuous first trace 202 and a continuous second trace 204 that is connected in series with the first trace 202. The first trace 202 forms a first resistive structure in the strain-sensitive structure 262. The second trace 204 forms a second resistive structure in the strain-sensitive structure 262 that is connected in series with the first resistive structure.

Three terminals or signal lines 310, 312, 316 are connected to the strain-sensitive structure 262. A signal line 310 connects to one end of the first trace 202 and a second signal line 312 connects to a first end of the second trace 204. A common signal line 316 connects to the other ends of the first and second traces 202, 204. The three terminals or signal lines 310, 312, 316 are discussed in more detail in conjunction with FIG. 3.

The first trace 202 is arranged in a first trace pattern and the second trace 204 is arranged in a second trace pattern. In the illustrated embodiment, the first and second traces 202, 204 are arranged in partial concentric arcs or curves with the second trace 204 positioned inside the first trace 202. The partial concentric curves of the first trace 202 are configured in a first serpentine pattern and the partial concentric curves of the second trace 204 are arranged in the first serpentine pattern (e.g., each trace double backs one or more times). In other embodiments, the first trace 202 can be positioned inside of the second trace 204.

The first trace 202 includes one or more legs 264 that are curved and have a first length. In the illustrated embodiment, the first length refers to the segments or legs that have a given radius of curvature (e.g., the longer segments or legs that extend from one side of the strain-sensitive structure 262 to the other side of the strain-sensitive structure 262).

The second trace 204 is arranged in a second trace pattern that includes legs 266 that are arranged in a second serpentine pattern. The number of legs 266 in the second trace 204 is greater than the number of legs 264 in the first trace 202.

The legs 266 have a shorter second length (e.g., L2 in FIG. 2C) compared to the length of the legs 264 in the first trace 202.

The arrangement of the first trace 202 causes the first resistive structure to be sensitive to strain in one or more directions while the arrangement of the second trace 204 causes the second resistive structure to be less sensitive to strain in any direction. The first trace 202 stretches or compresses based on an applied stress while the second traces 204 does not substantially elongate or compress based on the applied stress. Accordingly, the second resistive structure experiences less strain that the first resistive structure in response to an applied stress. In this manner, the second resistive structure may act as a reference for the first resistive structure.

In the absence of an applied stress, the resistances of the first and second traces 202, 204 can be substantially the same. This is due at least in part to the first and second traces 202, 204 being fabricated at the same time and with the same material.

Figure 2G:
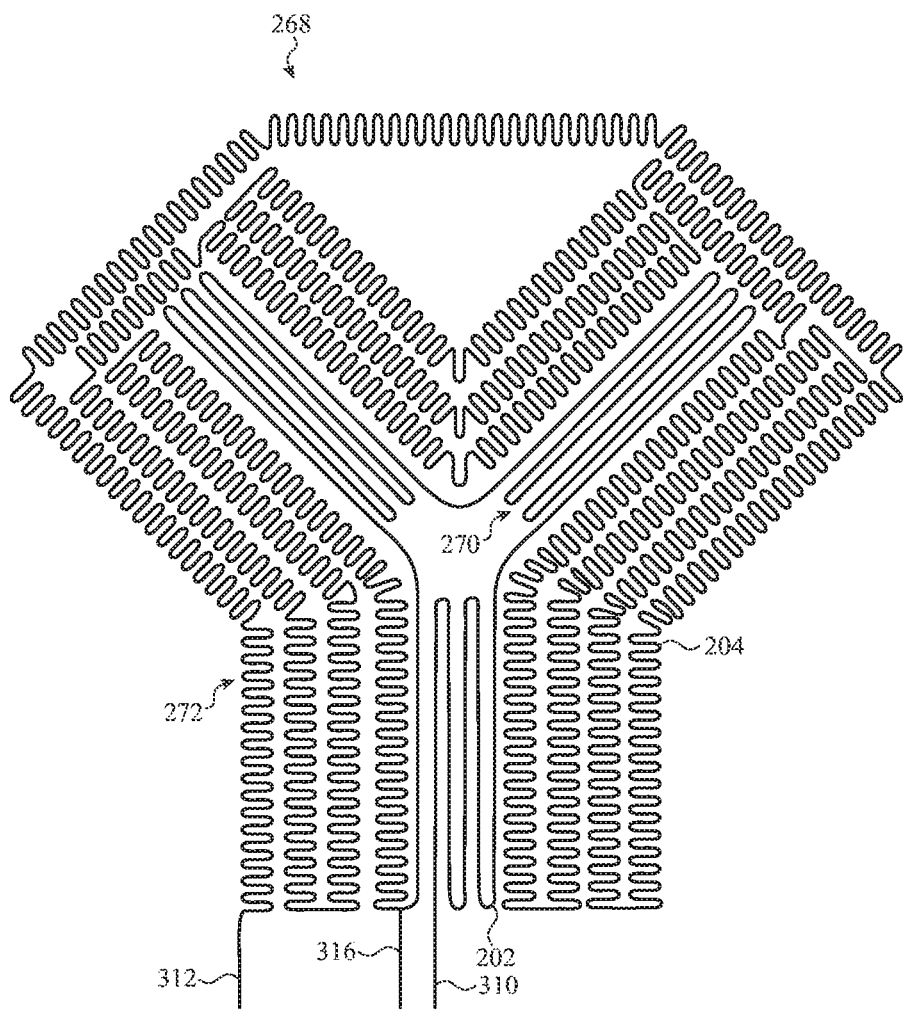
FIG. 2G shows a second example strain-sensitive structure that is suitable for use in a force sensing layer.

FIG. 2G depicts a third example strain-sensitive structure that is suitable for use in a force sensing layer. The strain-sensitive structure 268 includes a continuous first trace 202 and a continuous second trace 204 that is connected in series with the first trace 202. The first trace 202 forms a first resistive structure in the strain-sensitive structure 268. The second trace 204 forms a second resistive structure in the strain-sensitive structure 268 that is connected in series with the first resistive structure.

Three terminals or signal lines 310, 312, 316 are connected to the strain-sensitive structure 268. A first terminal 310 connects to one end of the first trace 202 and a second terminal 312 connects to a first end of the second trace 204. A common terminal 316 connects to the other ends of the first and second traces 202, 204. The three terminals or signal lines 310, 312, 316 are discussed in more detail in conjunction with FIG. 3.

The first trace 202 is arranged in a first trace pattern that includes one or more legs 270 that have a first length. In the illustrated embodiment, the first length refers to each longer segment that extends along an axis. The second trace 204 is arranged in a second trace pattern that includes legs 272 that are arranged in a serpentine pattern. The number of legs 272 in the second trace 204 is greater than the number of legs 270 in the first trace 202. The legs 272 have a shorter second length (e.g., L2 in FIG. 2C) compared to the length of the legs 270 in the first trace 202.

As shown in FIG. 2G, the first trace 202 is arranged in a "Y" shape with the legs 270 of the first trace 202 forming a serpentine pattern within each leg of the Y (e.g., doubles back one or more times within each leg of the Y). The second trace 204 is positioned outside of the first trace 202. The second trace 204 substantially conforms to the Y shape formed by the first trace 202. The second trace 204 is arranged in a serpentine pattern along each side of the Y shape (e.g., doubles back one or more times on each side of the Y shape). In other embodiments, the second trace 204 may form the Y shape and the first trace 202 may be positioned outside of the second trace 204.

In the absence of an applied stress, the resistances of the first and second traces 202, 204 can be substantially the same. This is due at least in part to the first and second traces 202, 204 being fabricated at the same time and with the same material.

The arrangement of the first trace 202 causes the first resistive structure to be sensitive to strain in one or more directions while the arrangement of the second trace 204 causes the second resistive structure to be less sensitive to strain in any direction. The first trace 202 stretches or compresses based on an applied stress while the second trace 204 does not substantially elongate or compress based on the applied stress. Accordingly, the second resistive structure experiences less strain that the first resistive structure in response to an applied stress. Thus, in some embodiments, the second resistive structure formed by the second trace 204 can act as a reference for the first resistive structure formed by the first trace 202.

Figure 3:
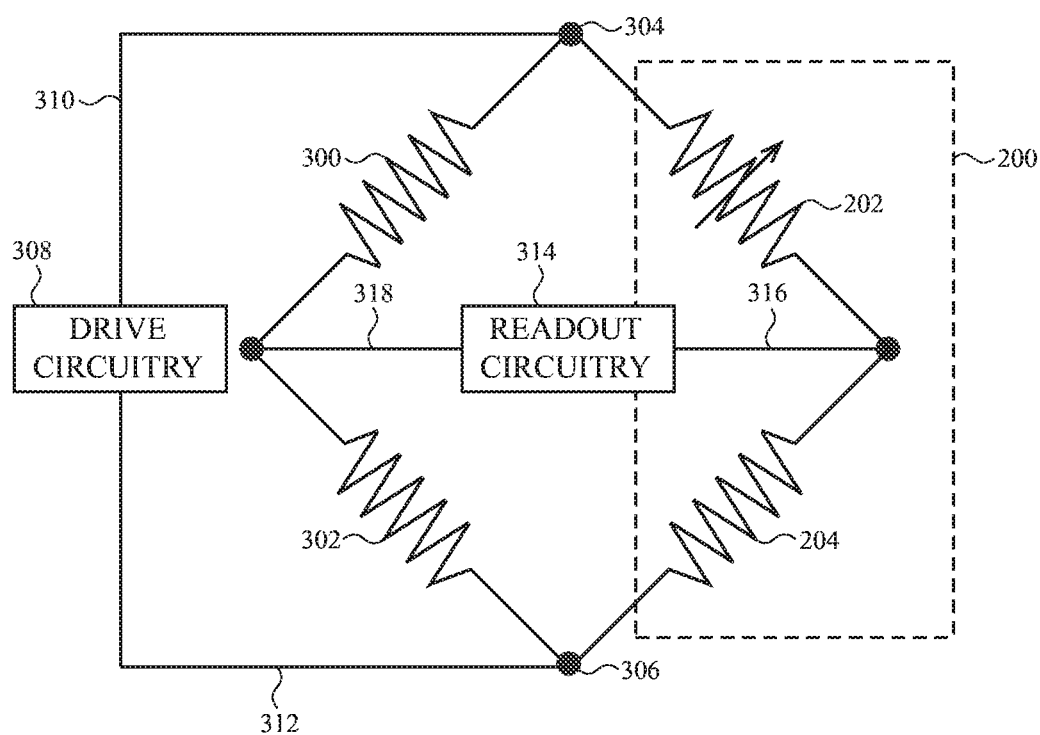
FIG. 3 depicts a schematic diagram of the strain-sensitive structure connected to a reference element.

FIG. 3 shows a schematic diagram of the strain-sensitive structure connected to a reference element. The variable first resistor 202 represents the first resistive structure formed by the first trace 202. Similarly, the second resistor 204 represents the second resistive structure formed by the second trace 204. Thus, the first and second resistors 202, 204 represent the strain-sensitive structure 200 shown in FIG. 2A. The first and second resistors 202, 204 are connected in series and form a first voltage divider.

Similarly, a first reference resistor or resistive structure 300 is connected in series with a second reference resistor or resistive structure 302 to form a second voltage divider. The first and second reference resistors 300, 302 have a known resistance and are coupled to the first and second resistors 202, 204 in a balancing network configuration, such as a Wheatstone bridge configuration. In particular, the first reference resistor 300 is connected to the variable first resistor 202 at a top node 304 and the second reference resistor 302 is connected to the second resistor 204 at a bottom node 306. The terms "top" and "bottom" are for descriptive purposes only and are not intended to limit the arrangement of the resistors, nor limit which signals are received by the nodes.

The first and second resistors 202, 204 and the first and second reference resistors 300, 302 are operably connected to drive circuitry 308 at nodes 304, 306. The drive circuitry 308 can include one or more circuits that are configured to produce the drive signals for the first and second resistors 202, 204 and the first and second reference resistors 300, 302. For example, the drive circuitry 308 may include one or more analog circuit components, digital circuit components, passive circuit components, and/or active circuit components (e.g., signal generators, amplifiers, digital-to-analog converters, and multiplexers). In some embodiments, one or more functions or outputs of the drive circuitry 308 can be partially or wholly implemented in software. A drive signal can be any suitable signal such as a voltage bias, a current signal, a voltage signal, and so on.

Drive circuitry 308 applies a drive signal ($V_T$) to the top node 304 on first drive signal line 310 (see 310 in FIGS. 2A, 2F, 2G), and a drive signal ($V_B$) to the bottom node 306 on second drive signal line 312 (see 312 in FIGS. 2A, 2F, 2G). Node 304 represents a first end of the first resistor 202 while the node 306 represents a first end of the second resistor 204.

Readout circuitry 314 receives a strain signal from the strain-sensitive structure 200 on strain signal line 316 (see 316 in FIGS. 2A, 2F, 2G). Strain signal line 316 is connected to a second end of the first resistor 202 and to a second end of the second resistor 204 (e.g., a common terminal). A reference signal is also detected on output signal line 318. The strain and reference signals can be any suitable signal, such as a voltage signal.

When the strain-sensitive structure 200 experiences strain, the strain-sensitive structure 200 and the reference resistors 300, 302 produce a measurable voltage differential that is detected by the readout circuitry 314. The voltage differential can be correlated to an amount of force applied to the input surface (e.g., cover layer 108).

The readout circuitry 314 can include one or more circuits that are configured to receive the strain signals on strain signal line 316 and the reference signals on output signal line 318. For example, the readout circuitry 314 may include one or more analog circuit components, digital circuit components, passive circuit components, and/or active circuit components (e.g., amplifiers, digital-to-analog converters, and multiplexers). In some embodiments, one or more functions or outputs of the readout circuitry 314 can be partially or wholly implemented in software.

The first and second reference resistors 300, 302 can be formed or positioned on the same substrate as the strain-sensitive structure 200, although this is not required. In some embodiments, the first and second reference resistors 300, 302 are formed as a strain-sensitive structure similar to the strain-sensitive structure 200 shown in FIG. 2A. The first and second reference resistors 300, 302 can be formed with the same material that forms the first and second traces 202, 204. Alternatively, the first and second reference resistors 300, 302 may be independent high-precision resistors, or may be formed as an array or network of independent resistors. In some cases, the two reference resistors 300, 302 may be variable; the resistance of the two reference resistors 300, 302 may be changed and/or adjusted dynamically.

Figure 4:
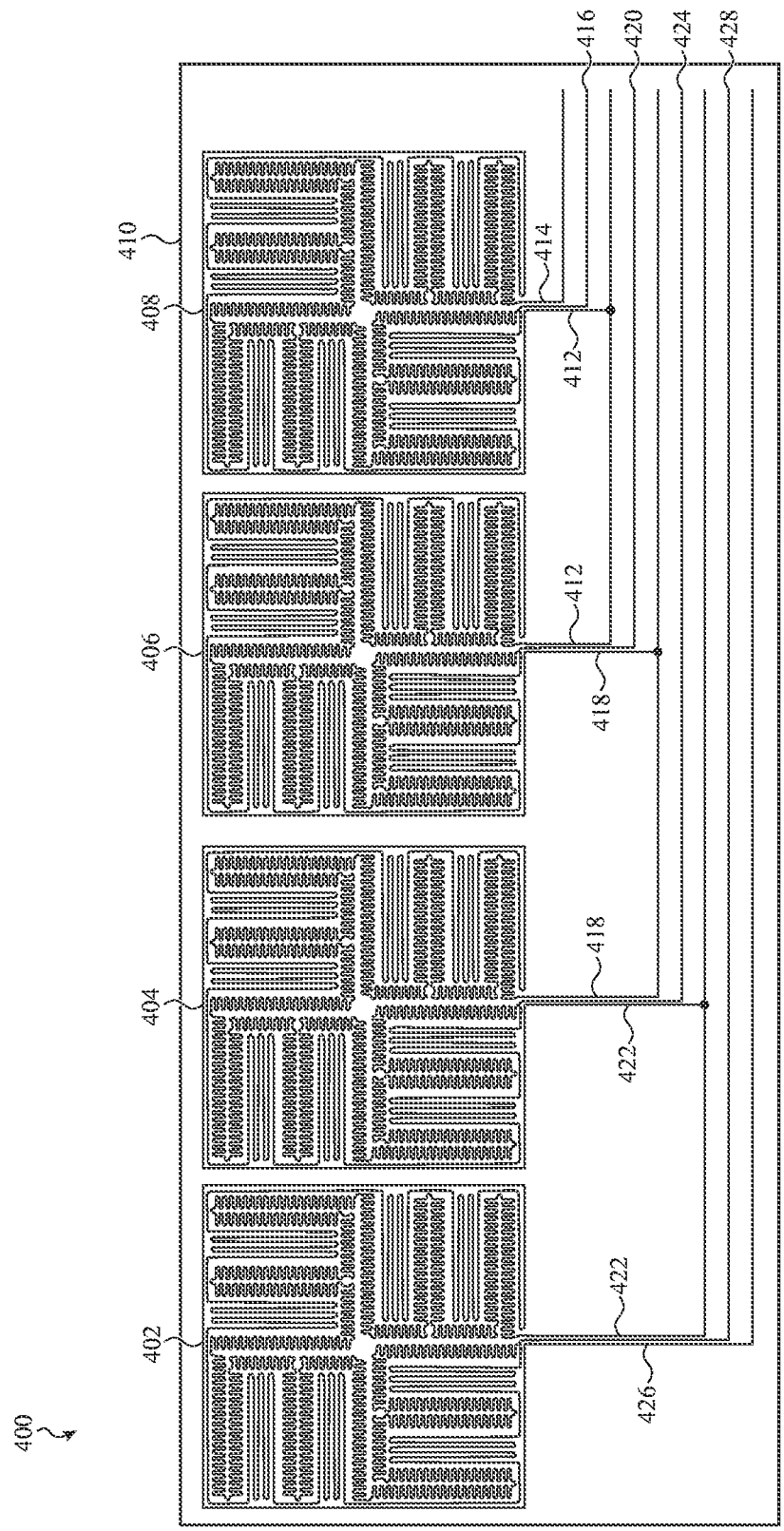
FIG. 4 shows a simplified view of a portion of a force sensing layer that includes an array of strain-sensitive structures.

FIG. 4 shows a simplified view of a portion of a force sensing layer that includes an array of strain-sensitive structures. In the illustrated embodiment, the first and second traces in each strain-sensitive structure are arranged as shown in FIG. 2A. However, other embodiments are not limited to this arrangement. The first and second traces can be arranged in any suitable arrangement that connects the second trace in series with the first trace and results in the first trace experiencing more strain than the second trace in response to an applied stress. For example, the first and second traces may be arranged as illustrated in FIGS. 2F and 2G.

The force sensing layer 400 includes the strain-sensitive structures 402, 404, 406, 408 formed on only one surface of the substrate 410. The density of the strain-sensitive structures 402, 404, 406, 408 on the substrate 410 can be any suitable density. In one embodiment, the density of the strain-sensitive structures 402, 404, 406, 408 is approximately one per square centimeter.

Each strain-sensitive structure 402, 404, 406, 408 is electrically connected to three signal lines. In the illustrated embodiment, a first drive signal line 412, 418, 422, 426 (e.g., similar to signal line 310 in FIGS. 2 and 3) is connected to respective strain-sensitive structures 402, 404, 406, 408 (e.g., at top node 304 shown in FIG. 3). A second drive signal line 412, 414, 418, 422 (e.g., similar to signal line 312 in FIGS. 2 and 3) is connected to respective strain-sensitive structures 402, 404, 406, 408 (e.g., at bottom node 306 shown in FIG. 3). A strain signal is received from each strain-sensitive structure 402, 404, 406, 408 on a respective strain signal line 416, 420, 424 428 (e.g., similar to signal line 316 in FIG. 3).

Figure 8:
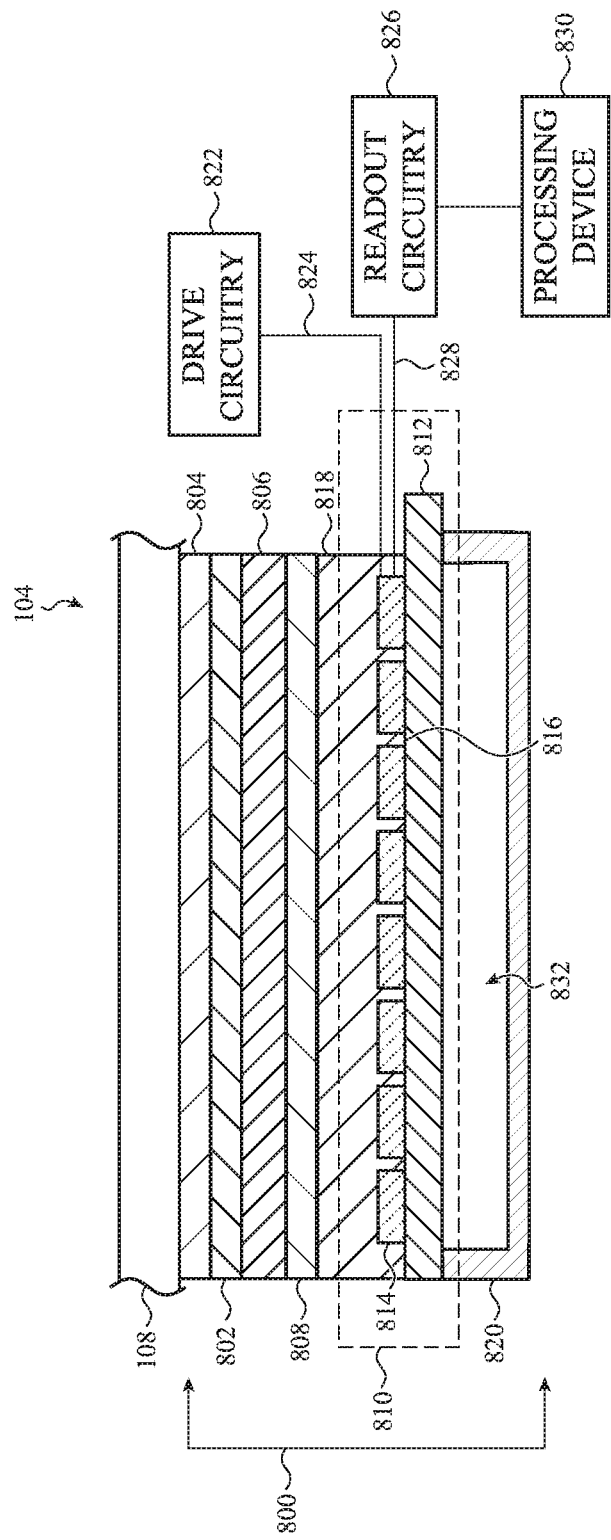
FIG. 8 shows a cross-sectional view of a portion of the display taken along line 8-8 in FIG. 1.

The drive signal lines 412, 414, 418, 422, and 426 are each connected to drive circuitry (see FIGS. 3 and 8). As described earlier, the drive circuitry can include one or more circuits that are configured to produce the drive signals for the strain-sensitive structures 402, 404, 406, 408 and for the reference resistors (e.g., reference resistors 300, 302).

The strain signal lines 416, 420, 424, and 428 are each connected to readout circuitry (see FIGS. 3 and 8). As described earlier, the readout circuitry may include one or more circuits that each receives a strain signal from the strain-sensitive structures 402, 404, 406, 408 on a respective strain signal line 416, 420, 424, and 428. The readout circuitry may also receive an output signal from the reference resistors on an output signal line (e.g., reference resistors 300, 302 on output signal line 318). In some embodiments, the readout circuitry is configured to detect changes in an electrical property (e.g., resistance) of each strain-sensitive structure 402, 404, 406, 408 based on the received reference and strain signals. In other embodiments, a processing device can receive the strain and output signals and detect changes in an electrical property (e.g., resistance) of each strain-sensitive structure 402, 404, 406, 408. The changes in the electrical property can be correlated to a magnitude or amount of force or stress that is applied to the substrate 410.

In the illustrated embodiment, two adjacent strain-sensitive structures 402, 404, 406, 408 share the drive signal lines 412, 418, and 422. Sharing drive signal lines reduces the total number of drive signal lines needed for the strain-sensitive structures 402, 404, 406, 408. For example, when signal lines are not shared, two adjacent strain-sensitive structures need a total of six signal lines (four drive signal lines and two strain signal lines). By sharing one drive signal line, the total number of signal lines needed for two adjacent strain-sensitive structures is reduced to five signal lines (two strain signal lines and three drive signal lines). Accordingly, in the illustrated embodiment, five drive signal lines 412, 414, 418, 422, 426 are used instead of six drive signal lines.

Additionally, in the illustrated embodiment, the shared drive signal lines are connected to different nodes of the adjacent strain-sensitive structures. For example, for strain-sensitive structures 406 and 408, the drive signal transmitted on the drive signal line 412 can be the drive signal $V_B$ (e.g., received at the bottom node 306 in FIG. 3) for the strain-sensitive structure 406 and $V_T$ (e.g., received at the top node 304 in FIG. 3) for the strain-sensitive structure 408. Similarly, the drive signal line 418 can be connected to the strain-sensitive structures 404 and 406. The drive signal transmitted on the drive signal line 418 can be received by the strain-sensitive structure 404 as the drive signal $V_B$ (received at the bottom node) and received by the strain-sensitive structure 406 as the drive signal $V_T$ (received at the top node). Finally, the drive signal line 422 may be connected to the strain-sensitive structures 402 and 404. The drive signal transmitted on the drive signal line 422 can be received by the strain-sensitive structure 402 as the drive signal $V_B$ (received at the bottom node) and may be received by the strain-sensitive structure 404 as the drive signal $V_T$ (received at the top node).

In FIG. 4, the signal lines 426 and 414 that are connected to the two outer strain-sensitive structures 402 and 408, respectively, are not shared because there is not a second strain-sensitive structure adjacent the strain-sensitive structures 402, 408 (e.g., there is only one strain-sensitive structure adjacent each strain-sensitive structure 402, 408). The drive signal transmitted on the signal line 426 may be received by the strain-sensitive structure 402 as the drive signal $V_T$ (received at the top node) while the drive signal transmitted on the signal line 414 may be received by the strain-sensitive structure 408 as the drive signal $V_B$ (received at the bottom node).

Magnetic fields are created when the drive signals pass through the strain-sensitive structures. In many cases, changing magnetic fields can induce a measurable electromotive force within the strain-sensitive structures. The patterns or arrangements of the first and second traces 202, 204 in each strain-sensitive structure are designed to reduce, minimize, or cancel the effects due to magnetic fields. The arrangement (e.g., rotations) of the first and second traces 202, 204 on the substrate is the same (or substantially the same), which reduces, minimizes, or cancels the effects due to changing magnetic fields.

In some embodiments, the drive signal lines 412, 414, 418, 422, and 426 and the strain signal lines 416, 420, 424, and 428 can be formed in a second layer in the substrate or in a different substrate (not shown). This allows the drive signal lines 412, 414, 418, 422, and 426 and the strain signal lines 416, 420, 424, and 428 to be formed with a material that is different from the material in the first and second traces (e.g., traces 202 and 204). For example, the strain and drive signal lines can be formed with a material that has a higher conductivity than the material in the first and second traces.

Figure 5:
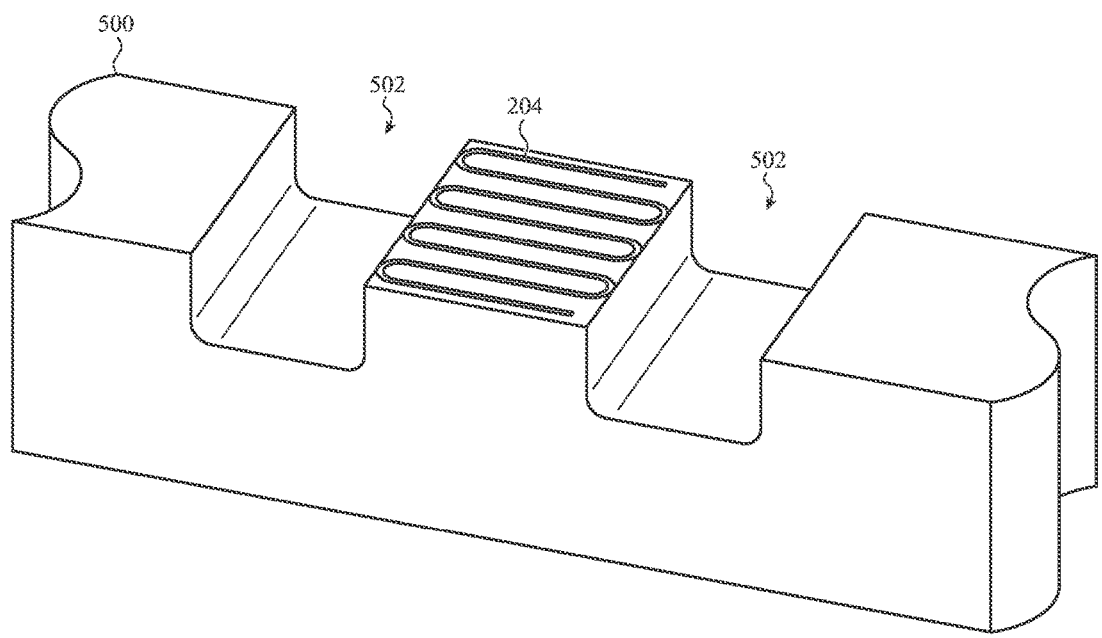
FIG. 5 depicts one example of the second trace on a substrate.

FIG. 5 shows one example of the second trace on a substrate. The second trace 204 is formed on a surface of a substrate 500. The substrate 500 can be configured to flex in a free, controlled, or limited manner. For example, the substrate 500 may be supported along its perimeter by a chassis or frame. The substrate 500 may be single layer or multi-layer including materials such as, but not limited to, a plastic (e.g., polyamide), metal, ceramic, polyethylene terephthalate, or any combination thereof.

When the second trace 204 is formed with a material having a high Young's modulus (e.g., a metal), and is supported by a substrate formed with a material having a lower Young's modulus (e.g., plastic), strain is reduced in the second trace 204 and experienced by the substrate 500. As discussed earlier, this is because the second trace 204 contacts the substrate over shorter distances. Consequently, the second trace 204 experiences less tension or compression in response to strain compared to the first trace 202.

In some embodiments, the substrate 500 can be etched or cut to form one or more trenches or cavities 502 along and adjacent the second trace 204 (or along and adjacent one or more portions of the second trace 204). The one or more cavities 502 may further reduce the amount of strain experienced by the second trace 204. When the substrate 500 is stressed (e.g., bent), the strain around the second trace 204 may be redirected to (or concentrated in) the one or more cavities 502 next to the second trace 204 rather than in the second trace 204. This can increase the strain relief function of the second trace 204.

Figure 6:
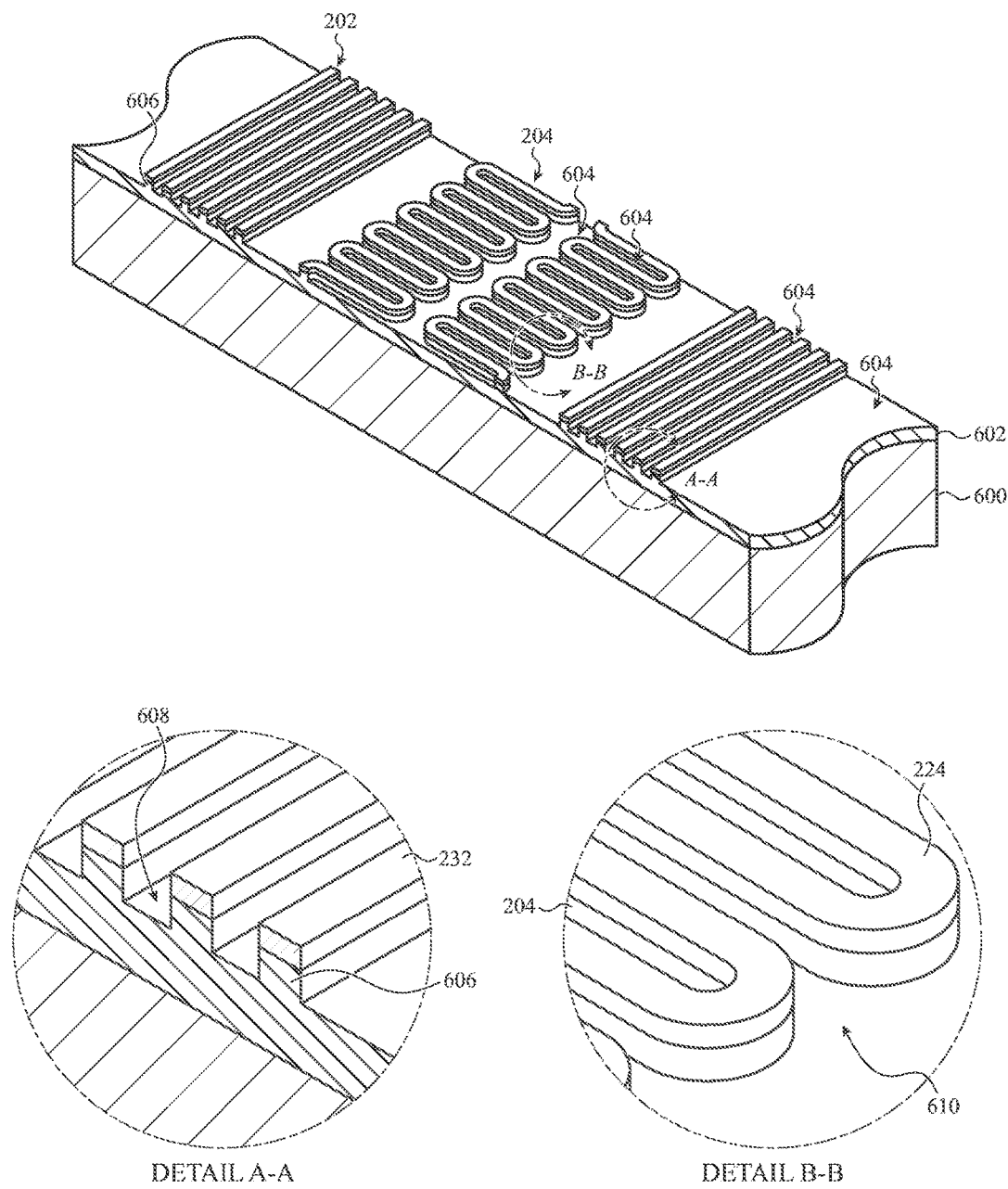
FIG. 6 shows an example of the first trace and the second trace on a substrate.

FIG. 6 depicts an example of the first and second traces on a substrate. Only a portion of the first and second traces 202, 204 are shown for simplicity. An insulating layer 602 is formed over the substrate 600, and the first and second traces 202, 204 are formed over the insulating layer 602. In one embodiment, the insulating layer 602 is formed with an insulating material having a higher Young's modulus (e.g., an oxide or nitride material), the first and second traces 202, 204 are formed with a material having a higher Young's modulus (e.g., a metal), and the substrate 600 is formed with a material having a lower Young's modulus (e.g., plastic).

In the illustrated embodiment, the sections 604 of the insulating layer 602 that are around and between the first and second traces 202, 204, around and between the legs 232, 238 in the first trace 202 (see FIGS. 2B and 2D), and around and between the legs 224 in the second trace 204 (see FIGS. 2C and 2D) are removed. The insulating layer 602 that is directly below the first and second traces 202, 204 remains and forms support bases 606. Each support base 606 supports a respective leg 224, 232, 238 in the first and second traces 202, 204.

Accordingly, as shown in the Detail A-A, channels or trenches 608 are formed between adjacent legs in the first and second sections 230, 236 of first trace 202 (e.g., between legs 232). Trenches 610 are also formed between adjacent legs 224 in the second trace 204 (see Detail B-B). Removing the sections of the insulating layer 602 around the tight turns of the shorter legs 224 in the second trace 204 allows the strain in the shorter legs 224 to be lower than the strain in the longer legs of the first trace 202.

Any suitable method can be used to remove the portions of the insulating layer 602. For example, a wet (e.g., chemical) etching process or a dry etching process (chemical or physical) can be used to remove the sections of the insulating layer 602 around and between the first and second traces 202, 204, around and between the legs 232, 238 in the first trace 202, and around and between the legs 224 in the second trace 204. An example method of forming the first and second traces is described in more detail in conjunction with FIG. 7.

In some embodiments, the sections of the substrate 600 corresponding to the sections 604 of the insulating layer 602 may be removed along with the sections 604 of the insulating layer 602. In such embodiments, the same removal process may be used to remove the sections 604 of the insulating layer 602 and the corresponding sections of the substrate 600. Alternatively, one removal process (e.g., a first etching process) can be used to remove the sections 604 of the insulating layer 602 and a different removal process (e.g., a second etching process) may be used to remove the corresponding sections of the substrate 600.

Alternatively, the insulating layer 602 may be omitted in some embodiments. In such embodiments, the sections of the substrate 600 around and between the first and second traces 202, 204, around and between the legs 232, 238 in the first trace 202, and around and between the legs 224 in the second trace 204 are removed. The substrate 600 that is directly below the first and second traces 202, 204 remains and forms support bases, with each support base supporting a respective leg 224, 232, 238 in the first and second traces 202, 204.

Alternatively, in some embodiments, only the sections of the insulating layer 602 and/or the substrate 600 around and between the legs 224 in the second trace 204 are removed. The sections of the insulating layer 602 and/or the substrate 600 around and between the legs 232, 238 in the first trace 202 are not removed. In such embodiments, the substrate 600 and/or the insulating layer 602 that is directly below the second trace 204 form(s) support bases, with each support base supporting a respective leg 224 in the second trace 204.

Figure 7:
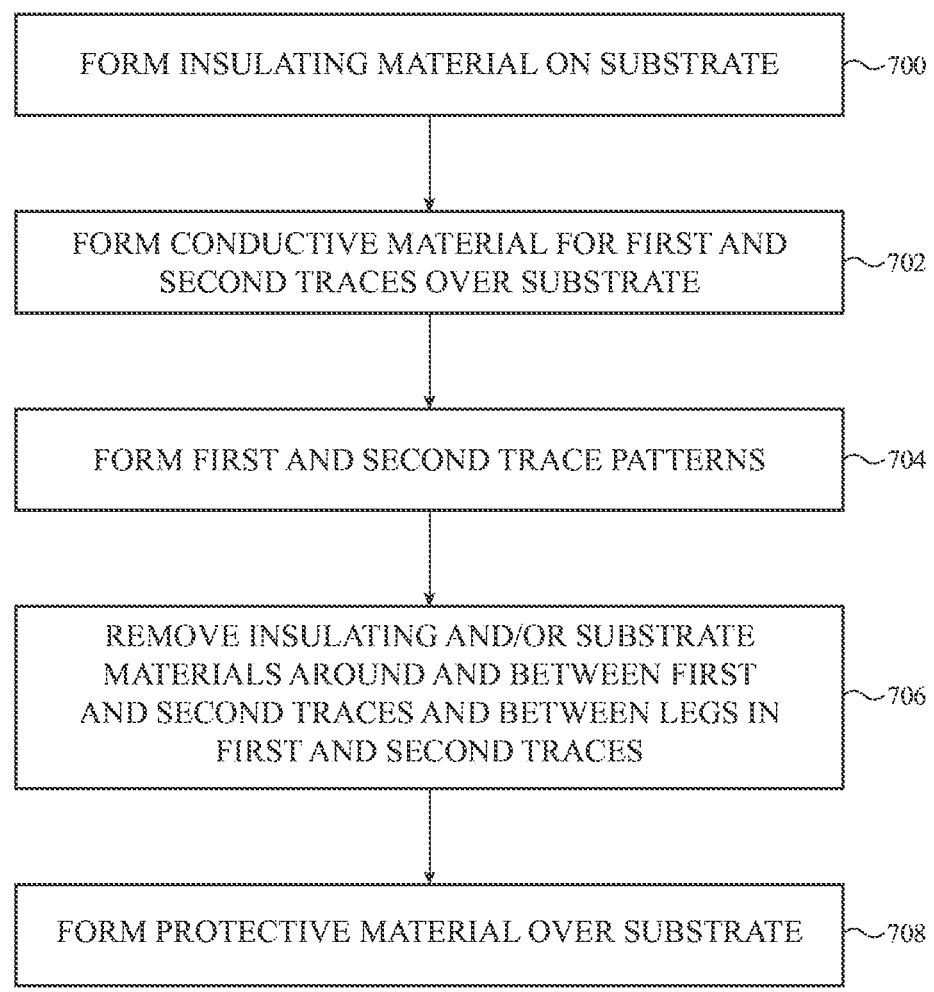
FIG. 7 depicts a flowchart of an example method of fabricating the first and second traces shown in FIG. 6.

FIG. 7 shows a flowchart of an example method of fabricating the first and second traces shown in FIG. 6. Initially, an insulating material is formed over a substrate (block 700). For example, the insulating material can be deposited or laminated over the substrate. In some embodiments, the insulating material can include one or more layers of insulating material. As described earlier, the insulating material is optional and may be omitted in some embodiments.

Next, as shown in block 702, the conductive material for the first and second traces is formed over the insulating layer. Like the insulating material(s), the conductive material for the first and second traces may be deposited (e.g., physical vapor deposition) over the insulating material. In some embodiments, the material for the first and second traces includes a stack of conductive layers. For example, the conductive material for the first and second traces can include a first layer of a first conductive material (e.g., nichrome material) and a second layer of a second conductive material (e.g., Constantan) formed over the first layer.

The first and second trace patterns (e.g., 218 in FIG. 2B and 222 in FIG. 2C) are then formed in the conductive material to produce the first and second traces, as shown in block 704. The first trace and the second trace can each have any suitable dimensions. The dimensions of a respective trace is based, at least in part, on the number of sections in each trace pattern (e.g., 230, 236, 240, 244, 246, 248, 250, 252, 254, 256, 258, 260 in FIGS. 2B-2D), the number of legs in respective sections (e.g., legs 224, 232, 238 in FIGS. 2B-2D), the density of the strain-sensitive structures on a substrate, and the like. In a non-limiting embodiment, the total length of the first trace is approximately one thousand millimeters, the total length of the second trace is approximately one thousand (1000) millimeters, the thickness of each trace 202, 204 is approximately two hundred (200) to two hundred and fifty (250) nanometers, and the width of each trace 202, 204 is approximately ten (10) to fifteen (15) microns. The spacing between the first and second traces is approximately ten (10) to fifteen (15) microns.

Since the first and second traces are formed of the same material or materials, the first and second traces can be formed in the same patterning operation. Any suitable technique can be used to pattern the conductive material. For example, in one embodiment, a mask that defines the pattern of one or more strain-sensitive structures can be positioned over the conductive material. The conductive material may then be etched to remove the conductive material that is not used to form the strain-sensitive structure(s). Thus, the first and second traces are formed during one etching operation.

Next, as shown in block 706, the sections of the insulating layer and/or the substrate that are around and between the first and the second traces, around and between the legs in the first trace, and between the legs in the second trace are removed. The substrate can be etched to any suitable depth. For example, in one embodiment, the depth of etching of the substrate around the first and the second traces is approximately three (3) to five (5) microns.

In some embodiments, the first and the second traces are used as a mask when the insulating layer and/or the substrate are etched. After the substrate is etched, the trenches slightly undercut the first and second traces. In such embodiments, the trenches are self-aligned with the first and second traces. In other embodiments, the mask that is used to pattern the conductive material in block 704 can be used to pattern the insulating layer and/or the substrate.

In some embodiments, a protective material may then be formed over the force sensing layer at block 708 (e.g., over the first and second traces, the insulating material, and/or the substrate). The protective material may also encapsulate the force sensing layer. In a non-limiting example, the protective material can be a material that has a lower Young's modulus. Block 708 is optional and may be omitted in other embodiments.

Other embodiments can produce the first and second traces differently. For example, the insulating material can be formed over the substrate and patterned to form the supporting bases. The conductive material for the first and second traces can then be formed over the insulating layer (including the supporting bases) and the conductive material that is not used to form the first and second traces may be removed. Alternatively, the conductive material for the first and second traces may be formed only on the top surfaces of the supporting bases.

As described earlier, the force sensing layer can be included in a display stack of a display. FIG. 8 depicts a cross-sectional view of a portion of the display taken along line 8-8 in FIG. 1. The cross-sectional view illustrates one example of a display stack 800 that is suitable for use for the display 104. At least a portion of the cover layer 108 may be positioned over the display stack 800. The cover layer 108 can have any suitable dimensions. For example, in one embodiment, a thickness of the cover layer 108 is approximately eight hundred (800) microns.

In the illustrated embodiment, the cover layer 108 can be disposed over a front polarizer 802. The cover layer 108 can be a flexible touchable surface that is made of any suitable material, such as, for example, a glass, a plastic sapphire, or combinations thereof. The cover layer 108 can act as an input region for a touch sensor and a force sensor by receiving touch and force inputs from a user. The user can touch the cover layer 108 with one or more fingers or with another element such as a stylus.

An adhesive layer 804 can be disposed between the cover layer 108 and the front polarizer 802. Any suitable adhesive can be used in adhesive layer 804, such as, for example, a liquid optically clear adhesive. A display layer 806 can be positioned below the front polarizer 802. As described earlier, the display layer 806 may take a variety of forms, including a liquid crystal display (LCD) element, a light-emitting diode (LED) display element, and an organic light-emitting diode (OLED) display element. In some embodiments, the display layer 806 can be formed from glass or have a glass substrate. Embodiments described herein include a multi-touch touchscreen LCD display layer.

Additionally, the display layer 806 can include one or more layers that is/are not shown in FIG. 8. For example, a display layer 806 can include a VCOM buffer layer, an LCD display element, and one or more conductive layers disposed over and/or under the display element. In one embodiment, the conductive layer(s) may each comprise an ITO layer.

A rear polarizer 808 may be positioned below the display layer 806, and a force sensing layer 810 below the rear polarizer 808. The force sensing layer 810 includes a substrate 812 having a first set of independent strain-sensitive structures 814 formed on a first surface 816 of the substrate 812. The substrate 812 may have any suitable dimensions. In one non-limiting embodiment, the thickness of the substrate 812 ranges from one hundred (100) to one hundred and fifty (150) microns.

The first set of strain-sensitive structures 814 can include one or more strain-sensitive structures 814. An adhesive layer 818 may attach the substrate 812 to the rear polarizer 808.

The combination of the cover glass 108, the front polarizer 802, the adhesive layers 804, 818, the display layer 806, the rear polarizer 808, and the force sensing layer 810 can have any suitable thickness. In one illustrative embodiment, the thickness is less than two thousand (2000) microns.

A back light unit 820 can be disposed below the force sensing layer 810. The back light unit 820 may be configured to support one or more portions of the substrate 812 that do not include strain-sensitive structures. For example, as shown in FIG. 8, the back light unit 820 can support the edges of the substrate 812. Other embodiments may configure a back light unit differently.

Each strain-sensitive structure 814 is connected to drive circuitry 822 through signal line 824. The signal line 824 represents the drive signal lines connected to each strain-sensitive structure 814 (e.g., drive signal lines 412, 414, 418, 422, 426 in FIG. 4). Each strain-sensitive structure 814 is connected to readout circuitry 826 through signal line 828. The signal line 828 represents the strain signal lines connected to each strain-sensitive structure (e.g., strain signal lines 416, 420, 424, 428 in FIG. 4). The readout circuitry 826 is configured to receive a strain signal from each strain-sensitive structure 814. In some embodiments, the readout circuitry 826 is configured to detect changes in an electrical property (e.g., resistance) of each strain-sensitive structure 814 based on the strain signals received from the strain-sensitive structures 814.

The strain signals output from the readout circuitry 826 can be received by a processing device 830. The processing device 830 is configured to correlate the strain signals to an amount of force applied to the cover layer 108. In some embodiments, the readout circuitry 826 may also be configured to provide information about the location of a touch based on the relative difference in the change of resistance of the strain-sensitive structures 814.

In the illustrated embodiment, a gap 832 exists between the force sensing layer 810 and the back light unit 820. The gap 832 can have any suitable dimension between the force sensing layer 810 and the back light unit 820. For example, in one embodiment, the gap 832 is approximately one hundred microns.

Strain measurements intrinsically measure the force at a point on the first surface 816 of the substrate 812 plus the force from the bottom at that point on the back surface of the substrate 812. When the gap 832 is included in the display stack 800, there are no forces on the back surface of the substrate 812. Thus, the forces on the front surface 816 can be measured independently of the forces on the back surface. In some embodiments, the gap 832 may be filled with an open cell or closed cell foam.

FIG. 8 depicts the force sensing layer 810 positioned below the display layer 806. In other embodiments, the force sensing layer 810 may be disposed over the display layer 806. In such embodiments, the substrate 812 and the first set of independent strain-sensitive structures 814 can each be formed with a transparent material or materials.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a display layer positioned below a cover layer;
a force sensing layer positioned adjacent the display layer, the force sensing layer comprising:
    a substrate; and
    a plurality of strain-sensitive structures formed on a surface of the substrate;
a processing device operably connected to the plurality of strain-sensitive structures and configured to:
    receive a strain signal from each strain-sensitive structure; and
    correlate at least one strain signal into an amount of force applied to the cover layer,
wherein each strain-sensitive structure in the plurality of strain-sensitive structures comprises:
    a first trace arranged in a first trace pattern on the surface of the substrate and forming a first resistive structure;
    a second trace arranged in a second trace pattern on the surface of the substrate and forming a second resistive structure, the second resistive structure connected in series with the first resistive structure, wherein
    the first trace pattern of the first resistive structure is sensitive to strain in one or more directions in response to an applied stress on the substrate,
    the second trace pattern of the second resistive structure is less sensitive to strain than the first trace pattern of the first resistive structure in response to the applied stress on the substrate; and
    in response to the applied stress on the substrate, a first resistance value of the first resistive structure changes more compared to a second resistance value of the second resistive structure.

2. The electronic device of claim 1, wherein:
a drive signal line is received at a first node of one strain-sensitive structure; and
the drive signal line is shared with an adjacent strain-sensitive structure and is received at a different second node of the adjacent strain-sensitive structure.

3. The electronic device of claim 1, wherein the substrate is attached to a bottom surface of the display layer.

4. The electronic device of claim 1, wherein:
a first terminal of the first resistive structure is connected to a first drive signal line;
a second terminal of the second resistive structure is connected to a second drive signal line; and
a common terminal of the first and the second resistive structures is connected to a strain signal line.

5. The electronic device of claim 1, wherein the first trace comprises a first section that includes a first set of legs arranged in a serpentine pattern, each leg in the first set of legs having a first length.

6. The electronic device of claim 5, wherein the second trace comprises a second section that includes a second set of legs arranged in the serpentine pattern, each leg in the second set of legs having a second length that is shorter than the first length.

7. The electronic device of claim 6, wherein:
one end of the first resistive structure is connected to a first drive signal line and another end of the first resistive structure is connected to a strain signal line; and
one end of the second resistive structure is connected to a second drive signal line and another end of the second resistive structure is connected to the strain signal line.

8. The electronic device of claim 1, wherein the first and the second traces comprise a metal or metal alloy formed in or on a plastic substrate.

9. The electronic device of claim 1, wherein the first trace pattern and the second trace pattern are arranged on the surface of the substrate to reduce magnetic interference.

10. The electronic device of claim 1, further comprising at least one cavity formed in the substrate adjacent at least a portion of the second trace.

11. The electronic device of claim 1, wherein:
the first trace comprises:
    a first section comprising a first set of legs arranged in a serpentine pattern, the first set of legs having a first length extending along a first axis;

a second section comprising a second set of legs arranged in the serpentine pattern, the second set of legs having the first length extending along the first axis; and a third section including a leg extending along a second axis and connecting the first section to the second section; and the second trace comprises:

a fourth section positioned adjacent three sides of the first section, the fourth section comprising a third set of legs arranged in the serpentine pattern, the third set of legs having a second length that is less than the first length; and a fifth section connected to the fourth section, the fifth section positioned adjacent three sides of the second section, the fifth section comprising a fourth set of legs arranged in the serpentine pattern, the fourth set of legs having the second length.

12. The electronic device of claim 11, wherein the second trace further comprises a sixth section positioned adjacent, and connected to, the fifth section, the sixth section comprising a fifth set of legs arranged in the serpentine pattern, the fifth set of legs having the second length extending along the second axis.

13. The electronic device of claim 11, wherein the first trace pattern and the second trace pattern are duplicated and rotated at least once on the substrate.

14. The electronic device of claim 13, wherein the first and the third sections of the first trace are arranged to detect strain along the first axis and a rotated first section and a rotated third section of the first trace are arranged to detect strain along the second axis.

15. The electronic device of claim 11, wherein the second axis is normal to the first axis.

16. The electronic device of claim 11, wherein the fourth and the fifth sections each experience less strain in response to the applied stress on the substrate compared to the first and the second sections.

17. The electronic device of claim 11, further comprising at least one cavity formed in the substrate adjacent at least a portion of the second trace.

18. The electronic device of claim 11, further comprising trenches formed in the substrate between and around each leg in the first, the second, and the third sections of the first trace and between and around each leg in the fourth and the fifth sections of the second trace.

19. The electronic device of claim 18, further comprising an insulating layer disposed between the substrate and the first and second traces.

* * * * *